United States Patent
Jungreis

(10) Patent No.: US 8,102,678 B2
(45) Date of Patent: Jan. 24, 2012

(54) HIGH POWER FACTOR ISOLATED BUCK-TYPE POWER FACTOR CORRECTION CONVERTER

(75) Inventor: Aaron Jungreis, Richardson, TX (US)

(73) Assignee: Flextronics AP, LLC, Broomfield, CO (US)

( * ) Notice: Subject to any disclaimer, the term of this patent is extended or adjusted under 35 U.S.C. 154(b) by 873 days.

(21) Appl. No.: 12/154,320

(22) Filed: May 21, 2008

(65) Prior Publication Data
US 2009/0290384 A1    Nov. 26, 2009

(51) Int. Cl.
*H02M 3/335* (2006.01)

(52) U.S. Cl. .................................. 363/21.03

(58) Field of Classification Search ............. 363/15–17, 363/24, 25, 123, 131–133, 149, 20, 21.01–21.03
See application file for complete search history.

(56) References Cited

U.S. PATENT DOCUMENTS

| | | |
|---|---|---|
| 4,051,425 A | 9/1977 | Smith ............................. 363/86 |
| 4,273,406 A | 6/1981 | Okagami |
| 4,563,731 A | 1/1986 | Sato et al. |
| 4,645,278 A | 2/1987 | Yevak et al. |
| 4,695,933 A | 9/1987 | Nguyen et al. |
| 4,712,160 A | 12/1987 | Sato et al. ..................... 361/388 |
| 4,788,626 A | 11/1988 | Neidig et al. .................. 361/386 |
| 4,806,110 A | 2/1989 | Lindeman |
| 4,841,220 A | 6/1989 | Tabisz et al. |
| 4,857,822 A | 8/1989 | Tabisz et al. |
| 4,866,367 A | 9/1989 | Ridley et al. |
| 4,890,217 A | 12/1989 | Conway |
| 4,893,227 A | 1/1990 | Gallios et al. ................... 363/26 |
| 4,899,256 A | 2/1990 | Sway-Tin ...................... 361/386 |
| 4,975,821 A | 12/1990 | Lethellier |
| 5,038,264 A * | 8/1991 | Steigerwald ............... 363/21.02 |
| 5,090,919 A | 2/1992 | Tsuji |

(Continued)

FOREIGN PATENT DOCUMENTS

JP     4217869 A     8/1992

(Continued)

OTHER PUBLICATIONS

The Notification of Transmittal of the International Search Report and the Written Opinion of the International Searching Authority, or the Declaration; International Application No. PCT/US2009/065300, International Filing Date Nov. 20, 2009, Authorized Officer Blaine R. Copenheaver, 11 pages.

(Continued)

*Primary Examiner* — Adolf Berhane
(74) *Attorney, Agent, or Firm* — Haverstock & Owens LLP

(57) ABSTRACT

A regulated power factor corrected power supply apparatus is provided. The apparatus includes an input rectifier circuit for receiving an input AC voltage and outputting a full-wave rectified DC voltage. A single-stage isolated buck-type converter is coupled with the input circuit. The converter circuit comprises an isolated buck-type converter circuit including an isolation transformer. An output rectifier and semiconductor tap switch are coupled to a secondary winding of the isolation transformer. The tap switch couples a larger portion of the secondary winding to an output bulk capacitor during the portions of the input sinewave half-cycle, which are low in amplitude. The tap switch enables the single-stage isolation buck-type converter to operate over a much larger portion of the input sinewave, but also allows the converter to operate at high-efficiency over the majority of the input sinewave.

41 Claims, 11 Drawing Sheets

U.S. PATENT DOCUMENTS

| | | | |
|---|---|---|---|
| 5,101,322 A | 3/1992 | Ghaem et al. | 361/386 |
| 5,132,890 A | 7/1992 | Blandino | |
| 5,164,657 A | 11/1992 | Gulczynski | 323/275 |
| 5,235,491 A | 8/1993 | Weiss | 361/694 |
| 5,262,932 A | 11/1993 | Stanley et al. | 363/26 |
| 5,295,044 A | 3/1994 | Araki et al. | 361/709 |
| 5,365,403 A | 11/1994 | Vinciarelli et al. | |
| 5,438,294 A | 8/1995 | Smith | |
| 5,490,052 A | 2/1996 | Yoshida et al. | |
| 5,565,761 A | 10/1996 | Hwang | 323/222 |
| 5,565,781 A | 10/1996 | Dauge | 324/403 |
| 5,592,128 A | 1/1997 | Hwang | 331/61 |
| 5,673,185 A | 9/1997 | Albach et al. | |
| 5,712,772 A | 1/1998 | Telefus et al. | 363/21 |
| 5,742,151 A | 4/1998 | Hwang | 323/222 |
| 5,747,977 A | 5/1998 | Hwang | 323/284 |
| 5,786,687 A | 7/1998 | Faulk | |
| 5,798,635 A | 8/1998 | Hwang et al. | 323/222 |
| 5,804,950 A | 9/1998 | Hwang et al. | 323/222 |
| 5,811,895 A | 9/1998 | Suzuki et al. | 307/125 |
| 5,818,207 A | 10/1998 | Hwang | 323/288 |
| 5,838,554 A | 11/1998 | Lanni | |
| 5,859,771 A | 1/1999 | Kniegl | |
| 5,870,294 A | 2/1999 | Cyr | 363/41 |
| 5,894,243 A | 4/1999 | Hwang | 327/540 |
| 5,903,138 A | 5/1999 | Hwang et al. | 323/266 |
| 5,905,369 A | 5/1999 | Ishii et al. | |
| 5,920,466 A * | 7/1999 | Hirahara | 363/21.02 |
| 5,923,543 A | 7/1999 | Choi | 363/21 |
| 6,058,026 A | 5/2000 | Rozman | |
| 6,069,803 A | 5/2000 | Cross | 363/21 |
| 6,091,233 A | 7/2000 | Hwang et al. | 232/222 |
| 6,091,611 A | 7/2000 | Lanni | |
| 6,160,725 A | 12/2000 | Jansen | 363/65 |
| 6,183,302 B1 | 2/2001 | Daikuhara et al. | |
| 6,272,015 B1 | 8/2001 | Mangtani | 361/707 |
| 6,282,092 B1 | 8/2001 | Okamoto et al. | 361/704 |
| 6,323,627 B1 | 11/2001 | Schmiederer et al. | |
| 6,326,740 B1 | 12/2001 | Chang et al. | |
| 6,341,075 B2 * | 1/2002 | Yasumura | 363/21.02 |
| 6,344,980 B1 | 2/2002 | Hwang et al. | |
| 6,366,483 B1 | 4/2002 | Ma et al. | |
| 6,388,897 B1 | 5/2002 | Ying et al. | |
| 6,390,854 B2 | 5/2002 | Yamamoto et al. | |
| 6,396,277 B1 | 5/2002 | Fong et al. | 324/402 |
| 6,407,514 B1 | 6/2002 | Glaser et al. | 315/247 |
| 6,459,175 B1 | 10/2002 | Potega | |
| 6,469,914 B1 | 10/2002 | Hwang et al. | 363/210.1 |
| 6,469,980 B1 | 10/2002 | Takemura et al. | 369/275.3 |
| 6,483,281 B2 | 11/2002 | Hwang | 323/299 |
| 6,487,095 B1 | 11/2002 | Malik et al. | |
| 6,531,854 B2 | 3/2003 | Hwang | 323/285 |
| 6,541,944 B2 | 4/2003 | Hwang | 323/225 |
| 6,549,409 B1 | 4/2003 | Saxelby et al. | |
| 6,583,999 B1 | 6/2003 | Spindler et al. | |
| 6,605,930 B2 | 8/2003 | Hwang | 323/225 |
| 6,657,417 B1 | 12/2003 | Hwang | 323/222 |
| 6,671,189 B2 | 12/2003 | Jansen et al. | 363/21.14 |
| 6,674,272 B2 | 1/2004 | Hwang | 323/284 |
| 6,775,162 B2 | 8/2004 | Mihai et al. | |
| 6,831,846 B2 * | 12/2004 | Yasumura | 363/21.02 |
| 6,919,715 B2 | 7/2005 | Muratov et al. | |
| 6,958,920 B2 | 10/2005 | Mednik et al. | 363/19 |
| 6,970,366 B2 | 11/2005 | Apeland et al. | |
| 7,035,126 B1 | 4/2006 | Lanni | |
| 7,038,406 B2 | 5/2006 | Wilson | |
| 7,047,059 B2 | 5/2006 | Avrin et al. | 600/409 |
| 7,064,497 B1 | 6/2006 | Hsieh | |
| 7,167,384 B2 * | 1/2007 | Yasumura | 363/127 |
| 7,202,640 B2 | 4/2007 | Morita | |
| 7,208,833 B2 | 4/2007 | Nobori et al. | |
| 7,212,420 B2 | 5/2007 | Liao | |
| 7,274,175 B2 | 9/2007 | Manolescu | |
| 7,286,374 B2 * | 10/2007 | Yasumura | 363/21.02 |
| 7,286,376 B2 | 10/2007 | Yang | |
| 7,301,785 B2 * | 11/2007 | Yasumura | 363/21.02 |
| 7,324,354 B2 | 1/2008 | Joshi et al. | |
| 7,339,801 B2 * | 3/2008 | Yasumura | 363/21.02 |
| 7,386,286 B2 * | 6/2008 | Petrovic et al. | 455/165.1 |
| 7,388,762 B2 * | 6/2008 | Yasumura | 363/21.02 |
| 7,423,887 B2 * | 9/2008 | Yasumura | 363/21.02 |
| 7,446,512 B2 * | 11/2008 | Nishihara et al. | 323/233 |
| 7,447,048 B2 * | 11/2008 | Yasumura | 363/21.02 |
| 7,450,388 B2 | 11/2008 | Beihoff et al. | |
| 7,486,066 B2 * | 2/2009 | Nagamune | 323/346 |
| 7,499,301 B2 | 3/2009 | Zhou | |
| 7,545,256 B2 * | 6/2009 | O'Toole et al. | 340/10.2 |
| 7,554,820 B2 * | 6/2009 | Stanley | 363/17 |
| 7,570,497 B2 | 8/2009 | Jacques et al. | |
| 7,573,729 B2 * | 8/2009 | Elferich et al. | 363/21.02 |
| 7,639,520 B1 | 12/2009 | Zansky et al. | |
| 7,656,686 B2 * | 2/2010 | Yasumura | 363/21.02 |
| 7,701,305 B2 | 4/2010 | Lin et al. | |
| 7,764,515 B2 | 7/2010 | Jansen et al. | |
| 2002/0008963 A1 | 1/2002 | DiBene, II et al. | |
| 2002/0011823 A1 | 1/2002 | Lee | 320/137 |
| 2003/0035303 A1 | 2/2003 | Balakrishnan et al. | 363/16 |
| 2004/0066662 A1 * | 4/2004 | Park | 363/21.02 |
| 2004/0228153 A1 | 11/2004 | Cao et al. | 363/71 |
| 2005/0024016 A1 | 2/2005 | Breen et al. | |
| 2005/0105224 A1 | 5/2005 | Nishi | 361/18 |
| 2005/0117376 A1 | 6/2005 | Wilson | |
| 2005/0138437 A1 | 6/2005 | Allen et al. | |
| 2005/0225257 A1 | 10/2005 | Green | |
| 2005/0281425 A1 | 12/2005 | Greuet et al. | 381/331 |
| 2006/0022637 A1 | 2/2006 | Wang et al. | |
| 2006/0152947 A1 | 7/2006 | Baker et al. | |
| 2006/0176719 A1 | 8/2006 | Uruno et al. | |
| 2007/0007933 A1 | 1/2007 | Chan et al. | |
| 2007/0236967 A1 * | 10/2007 | Liu et al. | 363/21.02 |
| 2008/0191667 A1 | 8/2008 | Kernahan et al. | |
| 2009/0231887 A1 | 9/2009 | Ye et al. | |
| 2009/0290384 A1 | 11/2009 | Jungreis | |
| 2009/0290385 A1 | 11/2009 | Jungreis et al. | |
| 2010/0289466 A1 | 11/2010 | Telefus et al. | |
| 2010/0322441 A1 | 12/2010 | Weiss et al. | |

FOREIGN PATENT DOCUMENTS

| | | |
|---|---|---|
| JP | 10243640 A | 9/1998 |
| JP | 2000083374 A | 3/2000 |
| JP | 2000253648 A | 9/2000 |
| JP | 2004208357 A | 7/2004 |

OTHER PUBLICATIONS

Bead Probe Handbook Successfully Implementing Agilent Medalist Bead Probes in Practice, "6 Test Fixturing", copyright Agilent Technologies, Inc., 2007, pp. 81-96.

SGS-Thomson Microelectronics Application Note, "An Automatic Line Voltage Switching Circuit", Vajapeyam Sukumar and Thierry Castagnet, copyright 1995 SGS-Thomson Microelectronics, Printed in Italy, 6 pages.

Scollo, P.Fichera R. Electronic Transformer for a 12V Halogen Lamp, 1999, ST Microelectronicspgs.1-4.

EE Times.com—"Team Claims Midrange Wireless Energy Transfer", by R. Colin Johnson, 4 pages, Nov. 6, 2007.

EE Times.com—"Wireless Beacon Could Recharge Consumer Devices", by R. Colin Johnson, 3 pages, Nov. 6, 2007.

"New Architectures for Radio-Frequency dc/dc Power Conversion", Juan Rivas et al, Laboratory for Electromagnetic and Electronic Systems, Massachusetts Institute of Technology, Room 10-171 Cambridge, MA 02139, pp. 4074-4084, Jan. 2004.

Notice of Allowance, date mailed Sep. 17, 2010, U.S. Appl. No. 12/079,662, filed Mar. 27, 2008, 27 pages.

Hang-Seok Choi et al., Novel Zero-Voltage and Zero-Current-Switching (ZVZCS) Full-Bridge PWM Converter Using Coupled Output Inductor, 2002 IEEE, pp. 641-648.

* cited by examiner

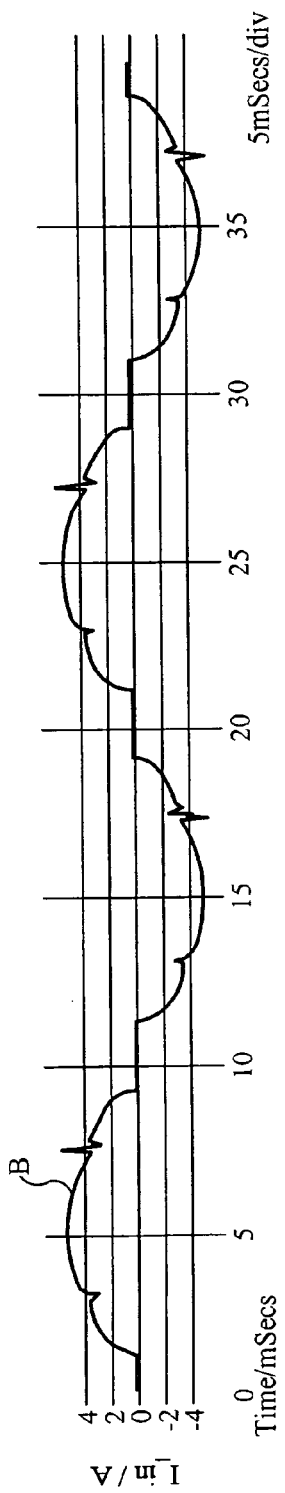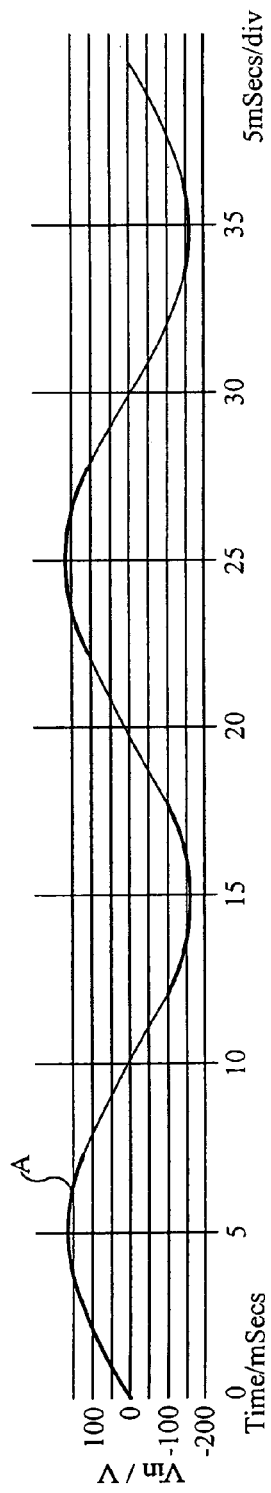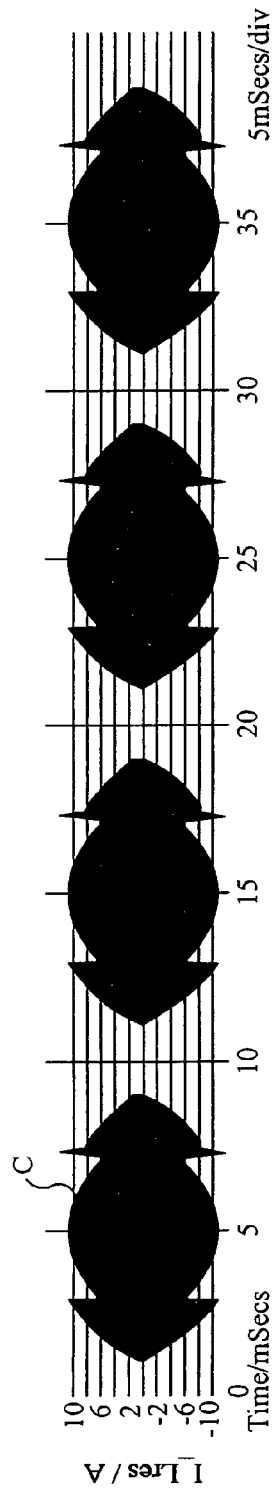

HIGH POWER FACTOR ISOLATED BUCK-TYPE POWER FACTOR CORRECTION CONVERTER

FIELD OF THE INVENTION

The present invention relates to power converters. More particularly, the present invention relates to a high power factor isolated buck-type power factor correction converter.

BACKGROUND

A power supply or power converter converts one form and voltage of electrical power to another desired form and voltage. AC-to-DC power supplies convert alternating current voltage, for example 115 or 230 volt alternating current (AC) supplied by a utility company, to a regulated direct current (DC) voltage. DC-to-DC power supplies convert DC voltage at one level, for example 400V, to another DC voltage, for example 12V.

A variety of different DC-to-DC power converter configurations are currently in use, most of which are variations of a buck converter, a boost converter, and a buck-boost converter. Some variations of buck converters, referred to as isolated buck-type converters, include an isolating transformer. Some versions of isolated buck-type converters include the push-pull converter, the forward converter, the half-bridge converter, and the full-bridge converter. Buck-type converters can either be duty-cycle-controlled switched converters, or they can be frequency-controlled resonant converters.

Each type of isolated buck-type converter can include various combinations of rectifiers and windings on the secondary side of the transformer. One typical variation is a full-bridge rectifier, which comprises 4 diodes configured to produce a same-polarity voltage output regardless of the polarity of the secondary winding voltage. A second typical variation comprises a center-tapped output such that the center tap is connected to a common point, and ends of each of the other two windings are connected to the anode of a diode. The cathodes of both diodes are connected to an output capacitor, and the other side of the output capacitor is attached to the center tap. Another variation is a current-doubler circuit. Still another variation is a split output in which one side of a center-tapped secondary charges a first output capacitor to a positive voltage and the other side of the center-tapped secondary charges a second output capacitor to a negative voltage. The two output capacitors are also connected to the center tap of the transformer.

The power factor of an AC electric power system is defined as the ratio of the real power to the apparent power, and is a number between 0 and 1. Real power is the capacity of the circuit for performing work in a particular time. Apparent power is the product of the current and voltage of the circuit. Due to energy stored in the load and returned to the source, or due to a non-linear load that distorts the wave shape of the current drawn from the source, the apparent power can be greater than the real power. Low-power-factor loads increase losses in a power distribution system and result in increased energy costs. Power factor correction (PFC) is a technique of counteracting the undesirable effects of electric loads that create a power factor that is less than 1. Power factor correction attempts to adjust the power factor to unity (1.00).

AC-to-DC converters above approximately 75 W, as well as some specific applications below 75 W, require the converter to draw current from the AC line with a high power factor and low harmonic distortion. Most conventional methods to produce a power factor corrected power supply with isolated low voltage DC outputs include cascading converter stages.

The term "cascading converter stages" refers to the use of multiple power conversion stages such that the output of one converter stage is connected to the input of the subsequent stage. Each converter stage uses controlled semiconductors such as MOSFETs or IGBTs to control the voltage, current, and/or power at the output and/or input of the converter stage. So, for example, a full-wave passive rectifier bridge is not considered to be a converter stage. While cascaded converter stages may share control circuitry, house-keeping power supplies, or communication with each other, the power semiconductors and energy storage elements that form each converter stage perform a power conversion function that is primarily independent of any other converter stage. Typical examples of converter stages are isolated or non-isolated variants of a buck converter, a boost converter, a buck-boost converter, and a sepic converter.

AC-to-DC power conversion is typically accomplished with cascaded converters instead of with a single-stage converter. For example, many AC-to-DC converters use two primarily independent converter stages: a first converter stage steps the input rectified sinusoidal voltage up to a high-voltage bus, and a second converter stage steps the high-voltage bus down to a low-voltage bus as well as provides isolation. While it is common for these two converter stages to communicate with each other, and while the ripple noise and loading effects on one converter have some effect on the other, these two types of converter stages can operate primarily independently of each other.

Cascading converter stages typically results in low overall efficiency since the overall efficiency is influenced by each stage. For example, if the first stage has an efficiency of 93% and the second stage has an efficiency of 93%, the overall efficiency is about 86.5%. In some cases there are three or more cascaded converter stages. For example, AC-to-DC converters with multiple outputs, such as 12V, 5V, and 3.3V, can use two cascaded converter stages to produce 12V and 5V, and then use a third cascaded stage to produce a 3.3V output from the 5V output. If the efficiency of the first cascaded stage, for example a non-isolated boost PFC converter, is 93% and the efficiency of the second stage, for example an isolated full-bridge converter is 93%, and the efficiency of the third cascaded stage, for example a 5V to 3.3V non-isolated buck converter is 96%, then the overall efficiency at the 3.3V output is only 83%. The efficiency very quickly degrades as more converter stages are cascaded to arrive at the final output voltage.

Single-stage converters contain no intermediate DC bus. A single-stage isolated AC-to-DC converter typically uses a passive rectifier to converter the AC input to a DC voltage. In the case of single-stage PFC AC-to-DC converters, the DC voltage at the output of the passive rectifier is similar to a full-wave-rectified sinewave, for example the absolute value of a sinusoid. In the case of non-PFC AC-to-DC single-stage converters, the output from the passive rectifier is typically connected to a large bulk capacitor, which causes the voltage at the output of the rectifier to resemble a nearly constant voltage with a small amount of second-harmonic line-frequency ripple superimposed on top of the constant voltage.

A single-stage AC-to-DC converter uses a single isolated power conversion stage to convert voltage at the output from the rectifier to a voltage, which is electrically isolated from the AC input.

The term "isolation" refers to isolating the input voltage from the output voltage. In particular, isolating means there is no path for DC current between the power supply's input source and its output terminals or load. Isolation is achieved using a power transformer in series with the power flow from input to output. Isolation can be applied to the power converter as a whole, or to individual components within the power converter where the voltage input to the component is isolated from the voltage output from the component.

Conventional technologies typically use one of two methods to provide an isolated DC output and a high power factor input. The first method uses a boost converter (step-up converter) to produce a high voltage bus (typically 250 VDC to 400 VDC), which is then cascaded with an isolated buck-type converter to step the high voltage bus down to an isolated low voltage output. This technique is relatively expensive and not extremely efficient.

A first conventional high power-factor isolated converter from the first method described above includes a boost converter to produce the high power factor input. Boost converter power factor correction circuits are limited in configurations. Voltage-source boost converters cannot be configured to provide an isolated output so another converter stage is included to provide isolation. Furthermore, boost converters are limited in their ability to be configured for soft-switching and resonant switching techniques, so these boost converters may produce large amounts of EMI, high losses (if operating at high frequency), and they often include expensive boost diodes to avoid problems with large reverse recovery losses in their diodes. Soft-switching, which can be accomplished through zero-voltage switching or zero-current switching, uses circuit resonance to ensure that power transistors switch at or near a zero-voltage level or zero-current level. This reduces the stress of the transistor component and also reduces the high frequency energy that would otherwise be radiated as noise. Hard-switching is the simultaneous presence of voltage across the transistor and current through the transistor when the transistor turns on and when the transistor turns off. This condition results in power dissipation within the device.

FIG. 1A illustrates a block diagram of a first conventional power factor corrected isolated converter according to the first conventional method. An EMI filter 18 is typically coupled between an AC input source 16 and the rest of the converter to prevent noise from coupling back to the AC source. The EMI filter 18 is coupled to a full-wave diode rectifier bridge 20 configured to provide a rectified sinusoidal input voltage to the rest of the converter. A non-isolated boost converter 21 draws a nearly sinusoidal current from the AC input source 16 and charges a high voltage bulk capacitor to typically 250V to 400V, thereby generating a high-voltage bus. An isolated buck-type converter 22 and an isolation transformer 24 steps the high voltage bus down to an isolated low voltage output.

The non-isolated boost converter 21 in FIG. 1A is typically hard-switched. Furthermore, to overcome high switching losses in the boost converter diode, the boost converter 21 typically either uses a silicon carbide diode, which is relatively expensive, or additional parts are added to enable soft-switched transitions, which is also expensive, or the boost converter uses critical or discontinuous conduction mode, which is applicable primarily to low power levels due to the extremely high ripple currents generated at the input of the converter.

The isolated buck-type converter 22, such as a full-bridge converter, includes the isolation transformer 24 to generate an isolated secondary output voltage. The secondary output voltage is rectified and filtered by rectifiers 26 to generate a DC output voltage.

The second converter stage, the isolated buck-type converter, is needed because the boost PFC converter cannot easily produce isolation. The first converter stage, the boost PFC converter, is used because isolated buck-type topologies typically cannot be effectively used to provide both the power factor correction and the isolated regulated voltage. Isolated buck-type converters cannot be effectively used to provide both the PFC and the isolation because they are unable to draw current from the input when the input voltage scaled by the turns ratio of the isolation transformer drops below the output voltage. In order to design a traditional isolated buck-type converter to accomplish both PFC and isolation, a designer would have to make a choice between either not drawing current from the input line for much of the input sinewave, or designing the isolation transformer turns ratio such that the output voltage multiplied by the isolation transformer primary-to-secondary turns ratio is a very low voltage. In the case where current is not drawn from the input line for much of the input sinewave, the power factor is low and the converter does not adequately accomplish power factor correction. In the case where a high turns ratio is used to enable drawing current for much of the input sinewave, the converter efficiency is low because the converter must operate at low duty cycles (or far off-resonance for a resonant converter) for the majority of the input sinewave.

The second method of providing an isolated DC output and high power factor input is typically directed to lower power applications and uses a flyback converter to provide a single-stage isolated converter that draws a high power-factor. A flyback converter is an isolated buck-boost converter in which the inductor is combined with the transformer, thereby multiplying voltage ratios and providing an isolated voltage output.

FIG. 1B illustrates a block diagram of a second conventional power factor corrected isolated converter according to the second conventional method. The second conventional power converter is configured similarly as the first conventional power converter of FIG. 1A except that the non-isolated boost converter 21 and the isolated buck-type converter 22 of FIG. 1A are replaced by a flyback converter 122, and the isolation transformer 24 of FIG. 1A is replaced by an isolated flyback transformer 124. The flyback converter 122 is configured to draw current at low input voltages as well as to provide isolation.

The second conventional power converter shown in FIG. 1B has a number of problems. The isolated flyback transformer 124 only transfers power to the load while the main transistor switch of flyback converter 122 is in an off state. The core of the transformer is therefore poorly utilized. Furthermore, the flyback converter 122 is hard-switched, which leads to high switching losses and EMI generation. Generally, flyback converters have a low efficiency and are only cost effective at low power.

A tap switch is a semiconductor switch coupled to a secondary winding of a transformer and is used to effectively increase, or decrease, the functional turns ratio of the transformer. Tap switches are utilized in AC-to-AC applications in order to make small adjustments to a transformer output voltage in response to variations in the rms input voltage. Tap switches can also be utilized in DC-to-DC applications, for example in increasing hold-up time of the converter by boosting the output voltage when the bulk cap voltage decreases immediately following a power outage.

SUMMARY OF THE INVENTION

A power converter is configured to provide an isolated low-voltage DC output and a high power factor input without cascading converter stages. The power converter is configured to operate at both high power levels and low power levels, as well as to operate at a high efficiency.

The power converter is configured to receive an AC input and provide a corresponding full-wave rectified DC voltage to a single-stage isolated buck-type converter. In general, the isolated buck-type converter can only draw current from its input when the input voltage is higher than its output voltage reflected to the primary side of the isolation transformer by the transformer turns ratio. Rectifiers and a tap switch are coupled to an isolation transformer output to generate a DC output voltage. In some embodiments, the isolated buck-type converter is a non-resonant converter and is configured to be controlled with duty-cycle control. In other embodiments, the isolated buck-type converter is a resonant converter, including a resonant tank, and is controlled by changing the difference between the switching frequency and a resonant frequency of the resonant tank.

In some embodiments, the isolated buck-type converter of the present invention is configured to operate with soft-switching of the semiconductor switches, thus overcoming the EMI issues associated with hard-switched converters. Furthermore, even for hard-switched isolated buck-type converters, the EMI is typically lower than for hard-switched boost-type converters because the switching voltages are typically much lower in isolated buck-type converters. Conventional boost-type power factor correction circuits often require an expensive high-voltage Schottky diode, such as a Silicon Carbide diode, to mitigate reverse recovery losses. The isolated buck-type converter of the present invention overcomes this problem in at least two ways. First, the output diodes are low voltage diodes, so inexpensive low-voltage Schottky diodes are used in the isolated buck-type converter rather than the high-voltage Schottky diode used by conventional boost power factor correction converters. Second, in cases in which the isolated buck-type converter utilizes soft-switching, such as the fully-resonant embodiments, the output diodes of the isolated converter are switched at zero current, so there is no reverse recovery.

The present invention overcomes the problems of using buck-type topologies through two different novel methods. The first novel method consists of adding a high-turns-ratio output tap switch to the isolation transformer. The high-turns-ratio output tap switch is coupled through a rectifier to the output during the portions of the input sinewave half-cycle, which are low in amplitude. This high-turns-ratio output tap switch allows the single-stage isolated buck-type converter to operate over a much larger portion of the input sinewave, but also allows the converter to operate at high-efficiency over the majority of the input sinewave.

The single-stage isolated buck-type converter with tap switch provides many advantages over conventional AC-to-DC power converters. First, the converter provides power factor correction and isolation in a single stage. Second, the tap switch enables the isolated buck-type converter to draw current from the AC source for a larger portion of the sinewave, thus increasing the power factor. Third, the tap switch allows the converter to operate with a lower turns ratio for the majority of the power transfer, thus increasing efficiency. Fourth, the tap switch can be configured to turn on and off in response to an input voltage set point that varies with the rms voltage of the input in such a way as to minimize component stress of the semiconductor switches and passive components of the converter. Fifth, the tap-switch, by enabling the use of isolated buck-type converters in PFC applications, enables all of the advantages of isolated buck-type converters in these applications such as soft-switching, fully resonant converters, lower voltage switches, lower EMI, and a fully utilized flux range for the isolation transformer. It will become apparent to those skilled in the art that additional advantages are provided in view of the power converter description provided herein.

The second novel method uses two single-stage isolated buck-type converters with inputs connected in series across the rectified AC line. The isolated outputs from these converters are combined to a single isolated output through a rectifier. When the input rectified sinewave half-wave is low in amplitude, one of the two converters is shorted, thereby placing the other of the two converters directly across the line. The net effect is to double the voltage across the input of the converter that is still operating. Shorting of one of the two converters can be accomplished either by the addition of another semiconductor switch across that converter (for the case of forward converters), or by shorting all of the input semiconductor switches for that converter (for bridge and push-pull converters). The power converter of the second method provides similar advantages as the power converter of the first method, without using a tap switch.

BRIEF DESCRIPTION OF THE DRAWINGS

FIGS. 10A and 10B illustrate exemplary current and voltage waveforms associated with the power converter 800 of FIG. 9.

FIG. 10C illustrates an exemplary resonant current waveform through the resonant inductor associated with the power converter 800 of FIG. 9.

Figure 1A:
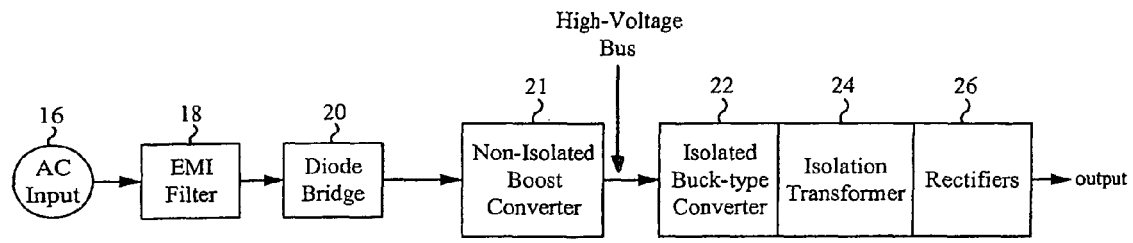
FIG. 1A illustrates a block diagram of a first conventional power factor corrected isolated converter according to a first conventional method.
Figure 1B:
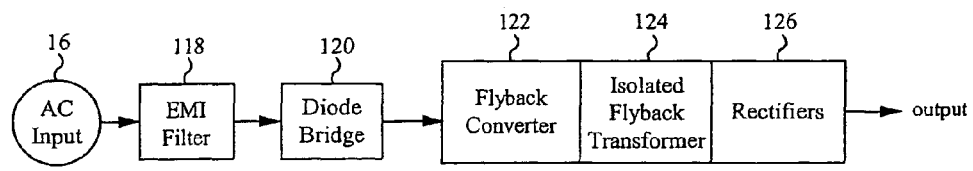
FIG. 1B illustrates a block diagram of a second conventional power factor corrected isolated converter according to a second conventional method.

Embodiments of the power converter are described relative to the several views of the drawings. Although similar element labels are used in the drawings, each element is specific to the particular figure to which it is used.

DETAILED DESCRIPTION OF THE PRESENT INVENTION

Embodiments of the present invention are directed to a power converter. Those of ordinary skill in the art will realize that the following detailed description of the present invention is illustrative only and is not intended to be in any way limiting. Other embodiments of the present invention will readily suggest themselves to such skilled persons having the benefit of this disclosure.

Reference will now be made in detail to implementations of the present invention as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The power converter is configured to receive an AC input, to provide power factor correction, and to output an isolated DC voltage. In a first embodiment, the power converter includes an isolated buck-type converter with an isolation transformer. A rectifier, a tap switch, and a bulk storage capacitor are coupled to an output of the isolation transformer.

The isolated buck-type converter draws current from an AC input line when the input voltage scaled by the turns ratio of the isolation transformer exceeds the output voltage. When the rectified AC input line is at a low voltage part of the sinewave, the tap switch is turned on, thus increasing the effective turns-ratio from input to output of the transformer. The isolated buck-type converter is thus able to draw current during the low voltage part of the sinewave. When the rectified AC input line is at the high voltage part of the sinewave, the tap switch is turned off, thus instantly decreasing the effective turns-ratio from input to output of the transformer. The isolated buck-type converter is still able to draw current during the high voltage part of the sinewave, and the isolated buck-type converter also operates at high duty cycles (for duty-cycle-controlled converters) or frequencies close to resonance (for fully resonant-type converters), thus enabling high-efficiency operation. In some embodiments, the power converter is configured such that the tap switch doubles the turn ratio of the transformer at the lower voltages as compared with the turns ratio of the transformer at the higher voltages. In general, the turns ratio of the transformer when the tap switch is turned on, which corresponds to lower input voltages, is referred to as the low-voltage turns ratio, and the turns ratio of the transformer when the tap switch is turned off, which corresponds to higher voltages, is referred to as the high-voltage turns ratio.

In an exemplary application, the transformer turns ratio is scaled so that the output voltage divided by the low-voltage turns ratio is approximately 50V (for a push-pull or full-bridge converter) and 100V when divided by the high-voltage turns ratio. If the isolated buck-type converter is configured as a half-bridge converter, then the isolation turns ratio is scaled by an additional factor of 2 to account for the reduction of voltage fed by the half-bridge. Designing with the above numbers enables the power converter to obtain approximately 99% power factor at 115 VAC and to operate at relatively high duty cycles (for duty-cycle-controlled converters) or frequencies close to resonance (for resonant converters) over the entire input sinewave. At higher input voltages, for example 230V, the power factor increases and the duty cycles decrease (for duty-cycle-controlled converters) or the switching frequency moves further from a resonant frequency (for resonant converters); however, the currents drawn at high-line allow for high-efficiency operation even at low duty-cycles (for duty-cycle-controlled converters) or at switching frequencies further from resonance (for resonant converters).

As previously described, isolated buck-type topologies offer many more design alternatives than boost-type or buck-boost-type topologies. Isolated buck-type topologies include half-bridge, full-bridge, single-switch forward, two-switch forward, and push-pull topologies. Furthermore, isolated buck-type topologies can be configured to allow full resonant and quasi-resonant switching as well as hard-switching.

Figure 2:
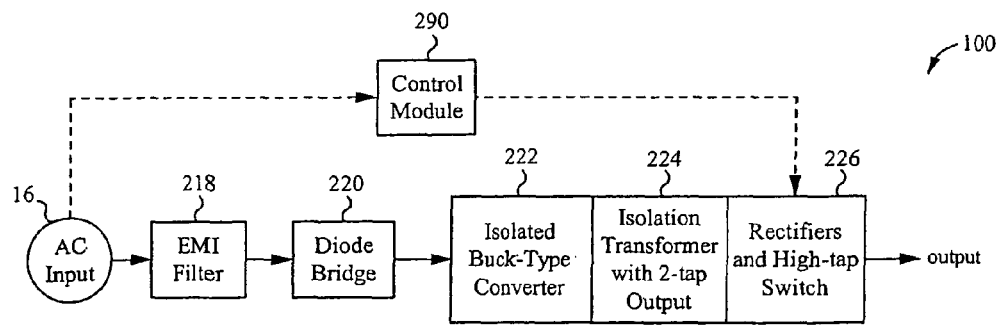
FIG. 2 illustrates a functional block diagram of a power converter in accordance with a first embodiment of the present invention.

FIG. 2 illustrates a functional block diagram of a power converter in accordance with the first embodiment of the present invention. The power converter 100 is configured as a high power factor isolated buck-type power converter. The power converter 100 includes an EMI filter 218 and a diode bridge 220. The EMI filter 218 is typically coupled between the AC input source 16 and the rest of the converter to prevent noise from coupling back to the AC source. The EMI filter 218 is coupled to the full-wave diode rectifier 220 configured to provide a rectified sinusoidal input voltage to the rest of the converter.

The power converter 100 also includes an isolated buck-type converter 222, an isolation transformer 224, rectifiers and tap switch 226, and a control module 290. In some embodiments, the isolation transformer 224 is configured with a two-tap output. The isolated buck-type converter 222 draws current from the AC input 16 when the voltage at the input of the transformer 224 scaled by the turns ratio exceeds the voltage at the output. The isolated converter 222 can be configured in one of many forms of an isolated buck-type converter including, but not limited to, a half-bridge converter, a push-pull converter, a full-bridge converter, and a forward converter. In some embodiments, the isolated converter 222 is configured as a resonant converter according to one of various resonant schemes including, but not limited to series resonant, parallel resonant, series-parallel resonant, and LLC resonant.

The isolated buck-type converter 222 and the isolation transformer 224 converts the full-wave rectified sinusoidal input voltage to one or more isolated outputs. In the exemplary configuration of FIG. 2, the output voltage of the transformer 224 is rectified to produce a single low voltage rectified output. The rectifiers and tap switch 226 includes a plurality of rectifiers that are coupled to the output of the transformer 224 and a tap switch that is coupled between the plurality of rectifiers and an output voltage bus.

When the rectified AC input line is at a low voltage part of the rectified sinewave, the tap switch 226 is turned on, thus causing a relatively large turns-ratio from input to output of the transformer 224. The isolated buck-type converter 222 is thus able to draw current during the low voltage part of the sinewave. When the rectified AC input line is at the high voltage part of the rectified sinewave, the tap switch 226 is turned off, thus instantly causing the transformer 224 to have a smaller turns ratio from primary to secondary. The isolated buck-type converter 222 is still able to draw current during the high voltage part of the sinewave, and the isolated buck-type converter 222 also operates at high duty cycles (for duty-cycle-controlled converters) or at switching frequencies closer to resonance (for resonant converters), thus enabling high-efficiency operation.

The control module 290 is coupled to the AC input 16 so as to receive as input the AC line voltage input to the power converter. Outputs from the control module 290 are coupled to the gate of each tap switch within the power converter. The circuit is configured such that the control module 290 provides independent control signals to each tap switch so as to maintain independent control of each in the event that more than one tap switch is present. The control module 290 generates control signals in response to the received AC line voltage, and sends the control signals to the tap switches to appropriately turn on and off.

Although the tap switch is described above as being turned on and off according to the input line voltage, it is contemplated that the tap switch is configured to be turned on and off according to other parameters. In general, for an isolated buck-type converter to operate, the input voltage must exceed the output voltage reflected through the transformer turns ratio. If for example the output voltage is 24V, the diode drop on the secondary is 1V, and the turns ratio is 2:1, then the input voltage must exceed 50V to draw any current. If the input voltage exceeds, for example, 100V, then the turns ratio can be changed from 2:1 to 4:1 to still draw current. The exact point at which the tap switch is activated can depend on the turns ratio of the transformer windings (both the standard ratio and the ratio with the tap switch activated), the input current waveform that one is trying to achieve, the ratings of the internal components, the rms value of the input voltage, and the ripple on the output bus.

Due to the large number of isolated buck-type converter configurations, the power converter of the present invention can be configured according to a number of different embodiments. For example, the isolated buck-type converter configurations include, but are not limited to, half-bridge, full-bridge, single-switch forward, two-switch forward, and push-pull topologies. The isolated buck-type converters can also be configured to allow traditional duty-cycle-controlled hard-switched PWM or quasi-resonant PWM, or a resonant tank can be added and the converter controlled by shifting the switching frequency or resonant frequency such that the switching frequency moves closer to or further from a resonant frequency of the resonant tank. The embodiment chosen will depend on many factors including, but not limited to power level of the converter, cost considerations, space requirements, voltage level of the input, voltage level of the output, and required efficiency over the entire load range. FIGS. 3-9 and the accompanying descriptions are shown below to illustrate some of the embodiments, though these are in no way limiting of the number of embodiments that are possible.

Figure 3:
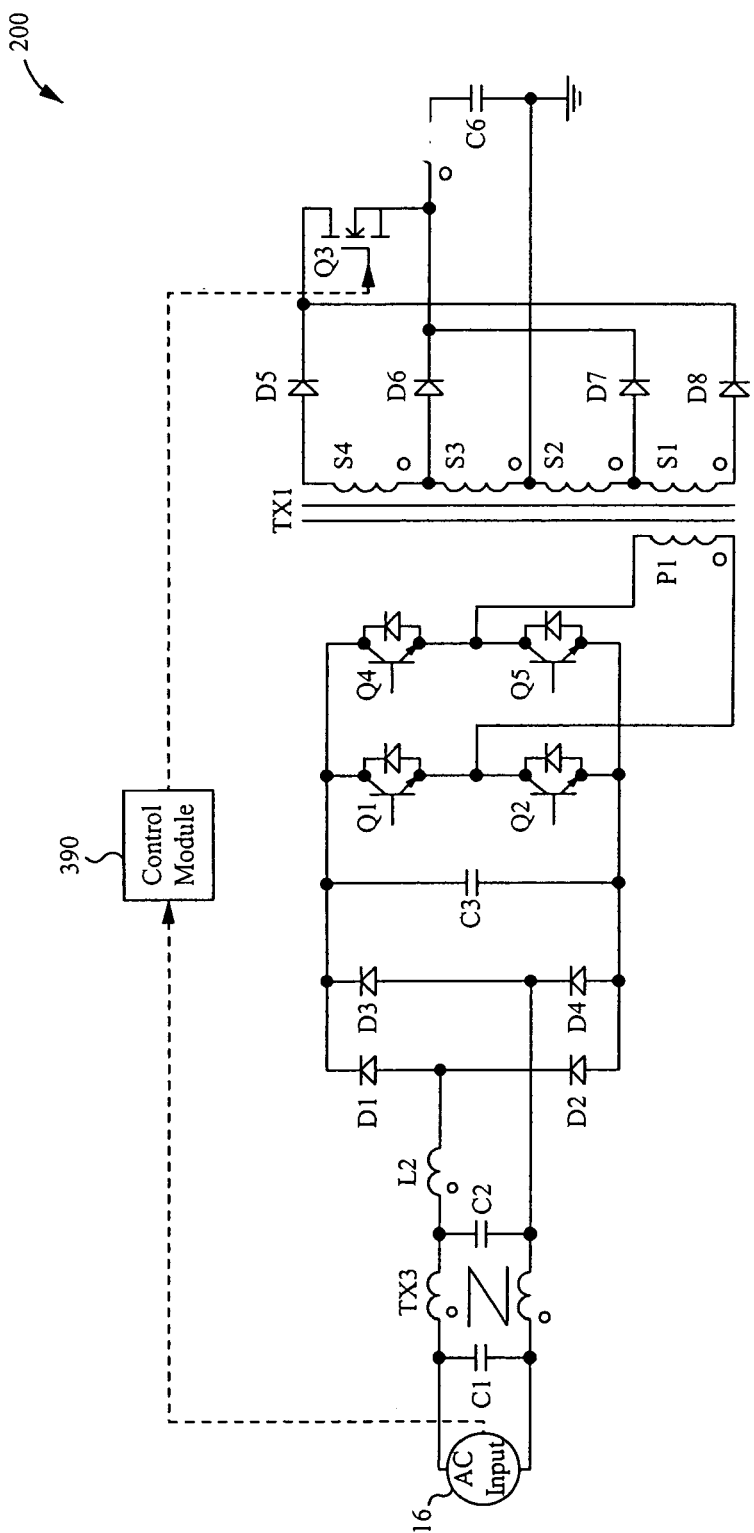
FIG. 3 illustrates a schematic diagram of a first exemplary configuration of the power converter of FIG. 2.

FIG. 3 illustrates a schematic diagram of a first exemplary configuration of the power converter of FIG. 2. The power converter 200 is configured as a full-bridge isolated power factor correction converter with hard-switched duty-cycle controlled PWM. Sinusoidal AC input line voltage 16 provides power to power converter 200. A capacitor C1, a capacitor C2, a transformer TX3, and an inductor L2 form the line filter 218 (FIG. 2) for reducing EMI. The inductor L2 acts as a differential-mode filter to filter out the differential-mode current. Four diodes D1, D2, D3, D4 form the full-wave bridge rectifier 220 (FIG. 2) configured to rectify the input line voltage, thereby providing a full-wave rectified sinusoidal voltage as output. A small capacitor C3 is coupled across the output of the full-wave bridge rectifier 120 to function as a high-frequency filter. The capacitance of the capacitor C3 is small enough to cause insignificant filtering at the input line-frequency (e.g. 50 Hz or 60 Hz) and negligible effect on the power factor, but large enough to cause significant filtering at the converter switching frequency. A transistor Q1, a transistor Q2, a transistor Q4, a transistor Q5, and an isolation transformer TX1 form a full-bridge converter. The transistors Q1, Q2, Q4, and Q5 function as switches and each transistor switch includes an anti-parallel diode.

The transformer TX1 is an isolation transformer with center-tapped output. In this exemplary application, the transformer TX1 includes one primary winding P1 and four secondary windings S1, S2, S3, S4. In some embodiments, the secondary windings S1-S4 are equal in number of turns. In other embodiments, the number of turns for one, some, or all of the secondary winding S1-S4 is different. The diodes D5, D6, D7, and D8 provide rectification of the current output from the transformer TX1. In other embodiments, the transformer TX1 is configured to have two output windings, rather than two center-tapped windings. In the case of two output windings, a full-bridge rectifier is coupled to each output of the transformer TX1. While such a configuration is possible, in practice, the voltage drop across the diodes in a full bridge rectifier causes too much power loss to be practical for most low-voltage high-efficiency applications, unless those diodes are replaced with synchronous MOSFETs. The full-bridge rectifier option is, however, beneficial for applications with a high-voltage output.

The transistor Q3 couples the diodes D5 and D8 to the inductor L1 and the output bulk capacitor C6. The voltage across the bulk capacitor is the output voltage of the circuit. The inductor L1 and the capacitor C6 form an output filter. In an exemplary application, the DC output voltage across the capacitor C6 is 12V and the turns ratio for the transformer TX1 is 8:1:1:1:1. In some embodiments, each of the transistors Q1, Q2, Q4, and Q5 are bipolar junction transistors (BJTs) and the transistor Q3 is a MOSFET. In other embodiments, the transistors Q1-Q5 can be any other type of semiconductor switching device.

The two secondary windings S1 and S4 of the transformer TX1, the two diodes D5 and D8, and the transistor Q3 act as a turns-ratio boost when the input line voltage is low enough to require a higher turns ratio. In this manner, the transistor Q3 is also referred to as a tap switch. A control module 390 is coupled to the AC input 16 and to a gate drive of the transistor Q3. The control module 390 provides control signals to the transistor Q3 to appropriately turn on and off according to the received AC line voltage.

Alternatively, the power converter 200 can be operated as a phase-shifted full-bridge, which can be used to implement soft-switching of the converter over much of the load range with the addition of a few small components on the primary side of the transformer such as is well-known in converter design practice.

Figure 4:
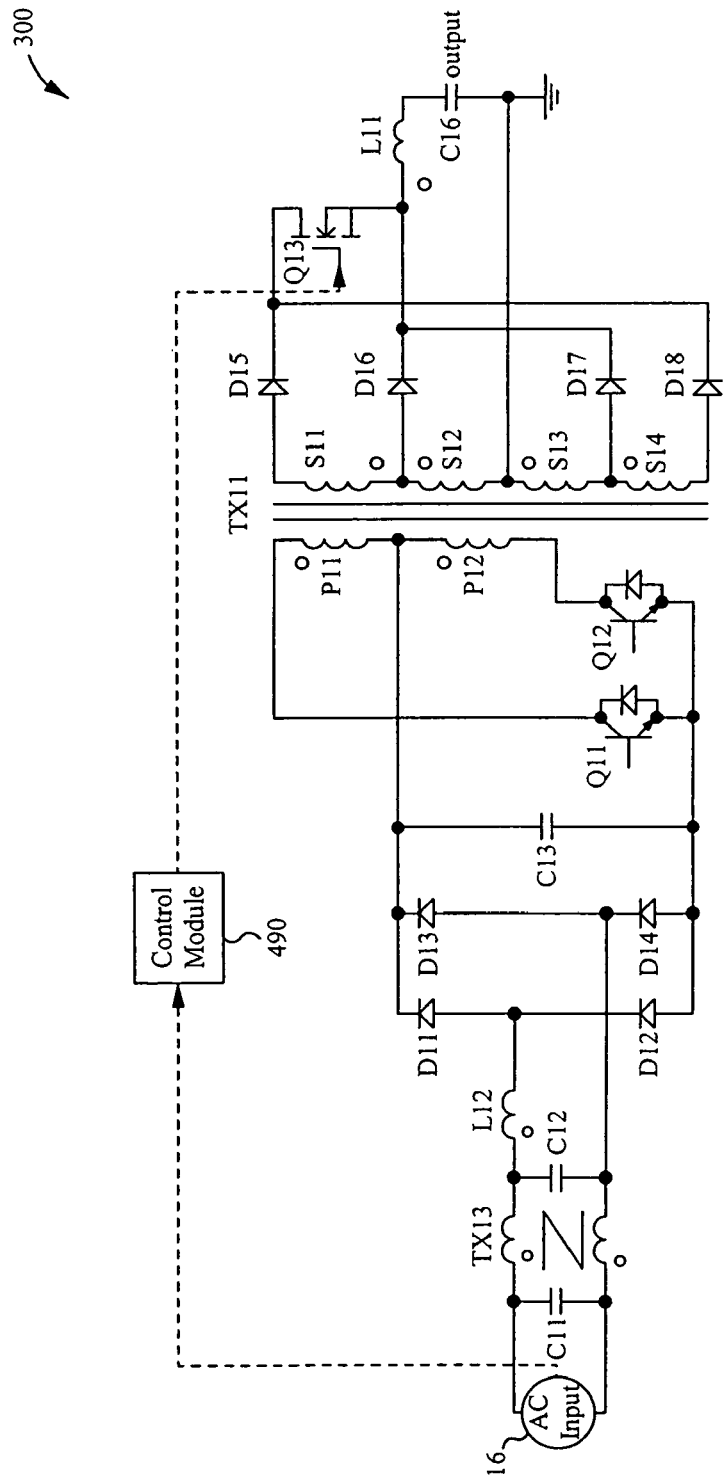
FIG. 4 illustrates a schematic diagram of a second exemplary configuration of the power converter of FIG. 2.

FIG. 4 illustrates a schematic diagram of a second exemplary configuration of the power converter of FIG. 2. The power converter 300 of FIG. 4 is similar to the power converter 200 of FIG. 3, except that the full-bridge converter is replaced by a push-pull converter. Specifically, the single primary winding P1 of the transformer TX1 (FIG. 3) is replaced by two identical primary windings P11 and P12 of the transformer TX11 in the power converter 300. Further, the transistor pair Q1, Q5 of the power converter 200 (FIG. 3) is replaced by the single transistor Q11 in the power converter 300, and the transistor pair Q2, Q4 of the power converter 200 (FIG. 3) is replaced by the single transistor Q12 in the power converter 300. The power converter 300 operates in a similar manner as the power converter 200 in FIG. 3. In an exemplary application, the DC output voltage across the capacitor C16 is 12V and the turns ratio for the transformer TX11 is 8:8:1:1:1:1.

Figure 5:
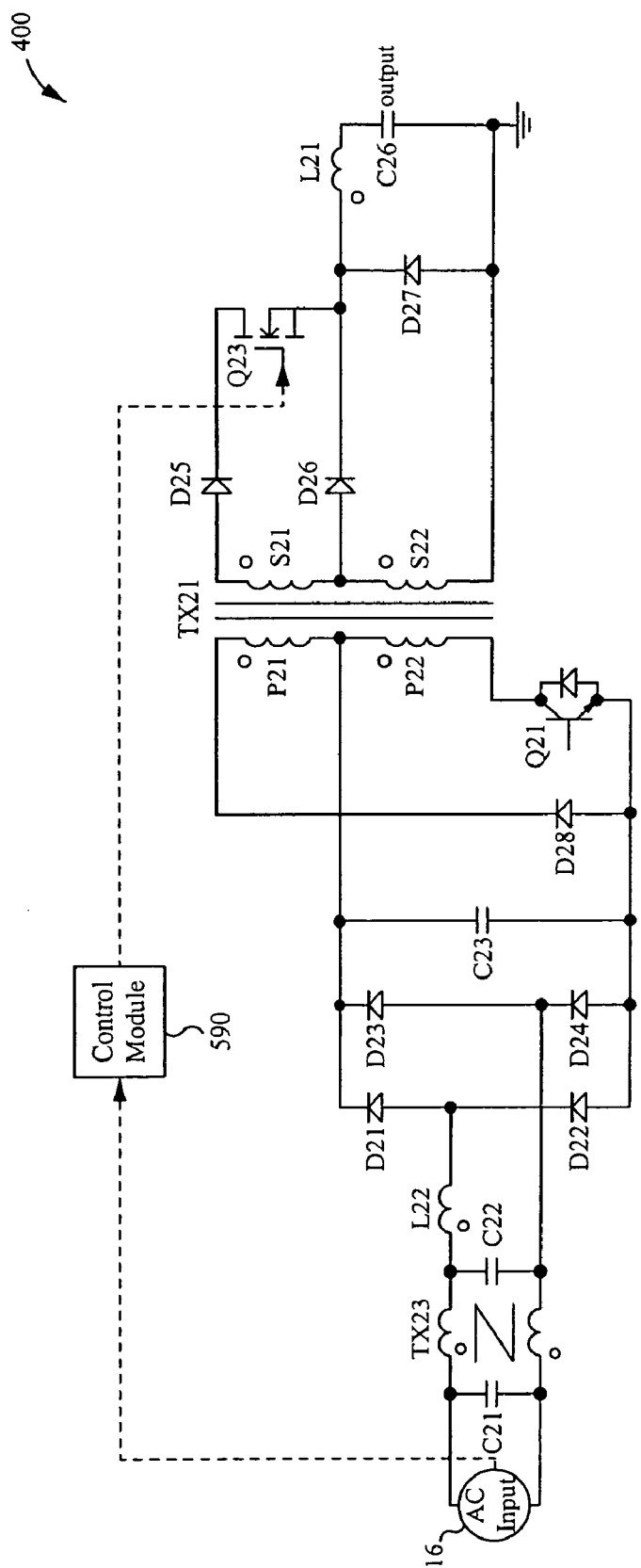
FIG. 5 illustrates a schematic diagram of a third exemplary configuration of the power converter of FIG. 2.

FIG. 5 illustrates a schematic diagram of a third exemplary configuration of the power converter of FIG. 2. The power converter 400 of FIG. 5 is similar to the power converter 300 of FIG. 4, except that the push-pull converter is replaced by a single-switch forward converter. Specifically, the four secondary windings S11-S14 of power converter 300 (FIG. 4) are replaced by two secondary windings S21 and S22 of the transformer TX21 in the power converter 400. The primary winding P21 is the reset winding for the core. Further, the transistor Q11 of the power converter 300 (FIG. 4) is replace by a diode D28 in the power converter 400. The power converter 400 also includes a secondary-side diode D27 to circulate energy in the output inductor L21 when the transistor Q21 is OFF. The power converter 400 operates in a similar manner as the power converter 300 in FIG. 4 except that energy is only transferred when transistor Q21 is on and the core is reset while D28 is on. In an exemplary application, the DC output voltage across the capacitor C26 is 12V and the turns ratio for the transformer TX21 is 8:8:1:1.

Figure 6:
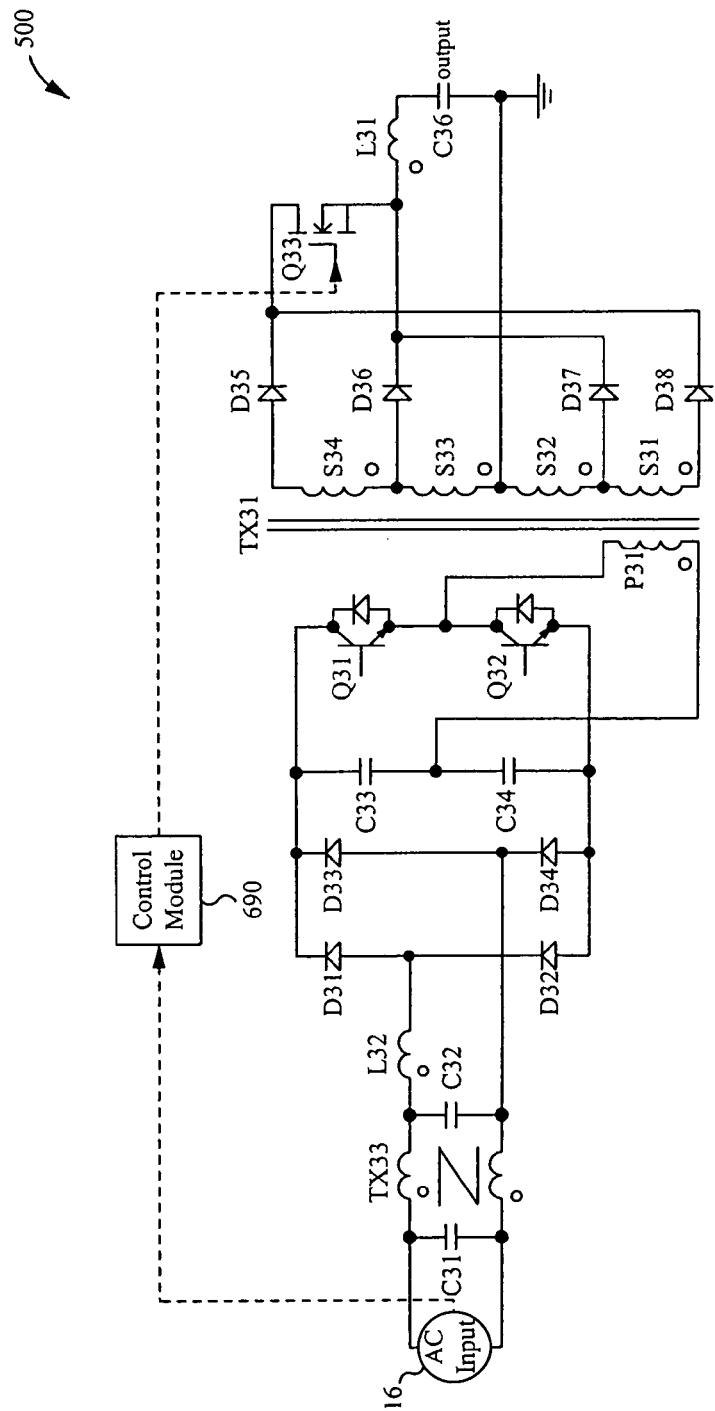
FIG. 6 illustrates a schematic diagram of a fourth exemplary configuration of the power converter of FIG. 2.

FIG. 6 illustrates a schematic diagram of a fourth exemplary configuration of the power converter of FIG. 2. The power converter 500 of FIG. 6 is similar to the power converter 200 of FIG. 3, except that the full-bridge converter is replaced by a half-bridge converter. Specifically, the transistor pair Q1, Q2 of the power converter 200 (FIG. 3) is replace by the capacitor pair C33, C34 in the power converter 500. The power converter 500 operates in a similar manner as the power converter 200 in FIG. 3. In an exemplary application, the DC output voltage across the capacitor C36 is 12V and the turns ratio for the transformer TX31 is 4:1:1:1:1.

Figure 7:
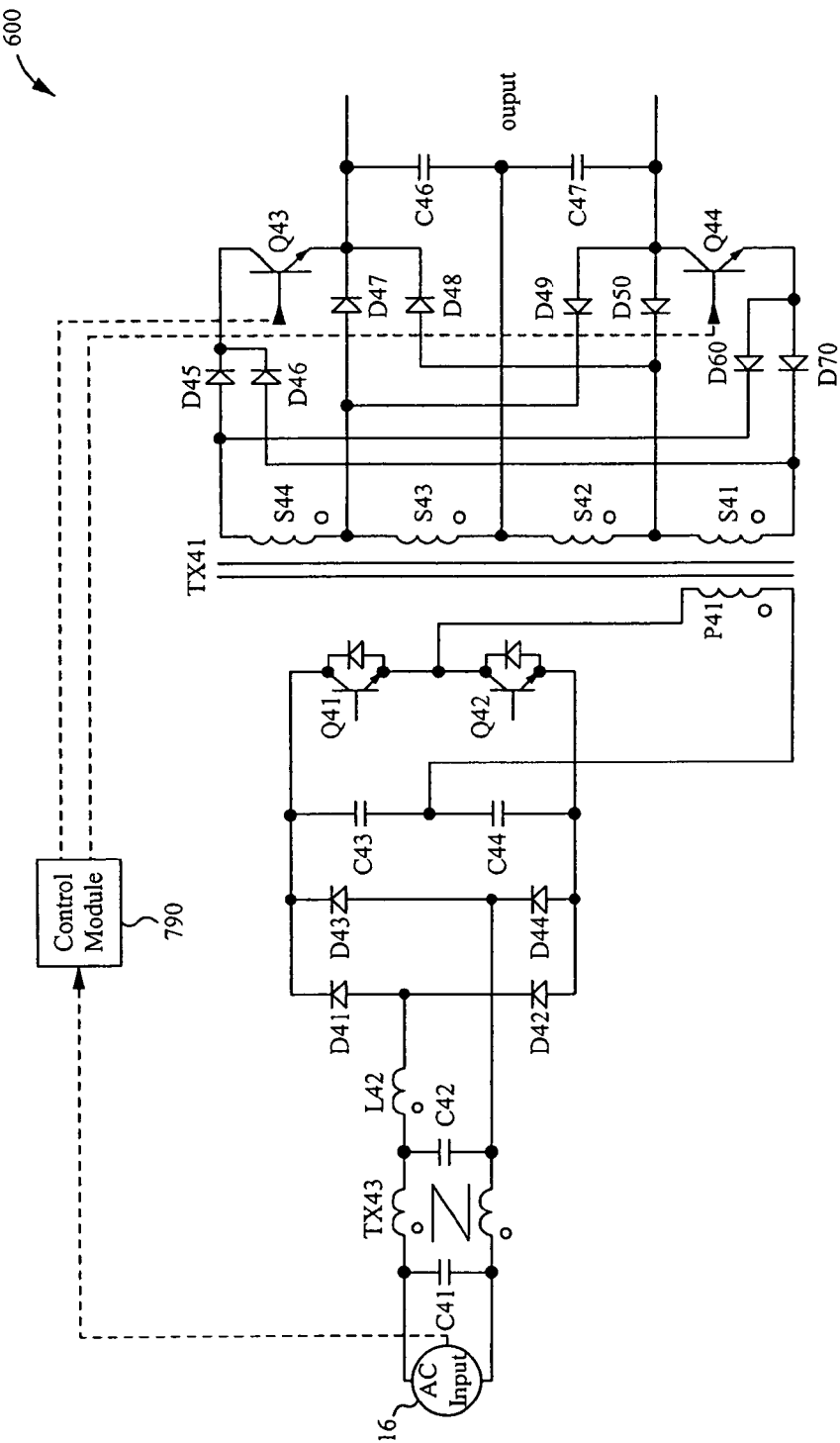
FIG. 7 illustrates a schematic diagram of a fifth exemplary configuration of the power converter of FIG. 2.

FIG. 7 illustrates a schematic diagram of a fifth exemplary configuration of the power converter of FIG. 2. The power converter 600 of FIG. 7 is similar to the power converter 500 of FIG. 6, except that the power converter 600 is configured with a push-pull output. Specifically, an additional transistor tap switch Q44, diodes D49, D50, D60, and D70, and output capacitor C47 are added to the output of the transformer TX41 in the power converter 600. The power converter 600 operates in a similar manner as the power converter 500 in FIG. 6, where the diodes D45-D48 and tap switch Q43 are configured to charge the capacitor C46. Additionally, the diodes D49, D50, D60, D70 and the tap switch Q44 are configured to charge the capacitor C47. The voltage across both capacitors C46 and C47 is the output voltage of the circuit. In an exemplary application, the DC output voltage across the capacitors C46 and C47 are each 12V and the turns ratio for the transformer TX41 is 4:1:1:1:1. The configuration of power converter 600 is particularly useful when the isolated converter output voltage is extremely high, such as 800V and above. The push-pull output can also be useful for obtaining positive and negative supplies with similar output ratings. The push-pull output configuration can be used with all symmetric isolated buck-type converter topologies such as push-pull, half-bridge, and full-bridge. In some embodiments, diodes D46, D48, D49, and D60 are left out so that secondaries S44 and S43 charge C46 while secondaries S42 and S41 charge C47.

Figure 8:
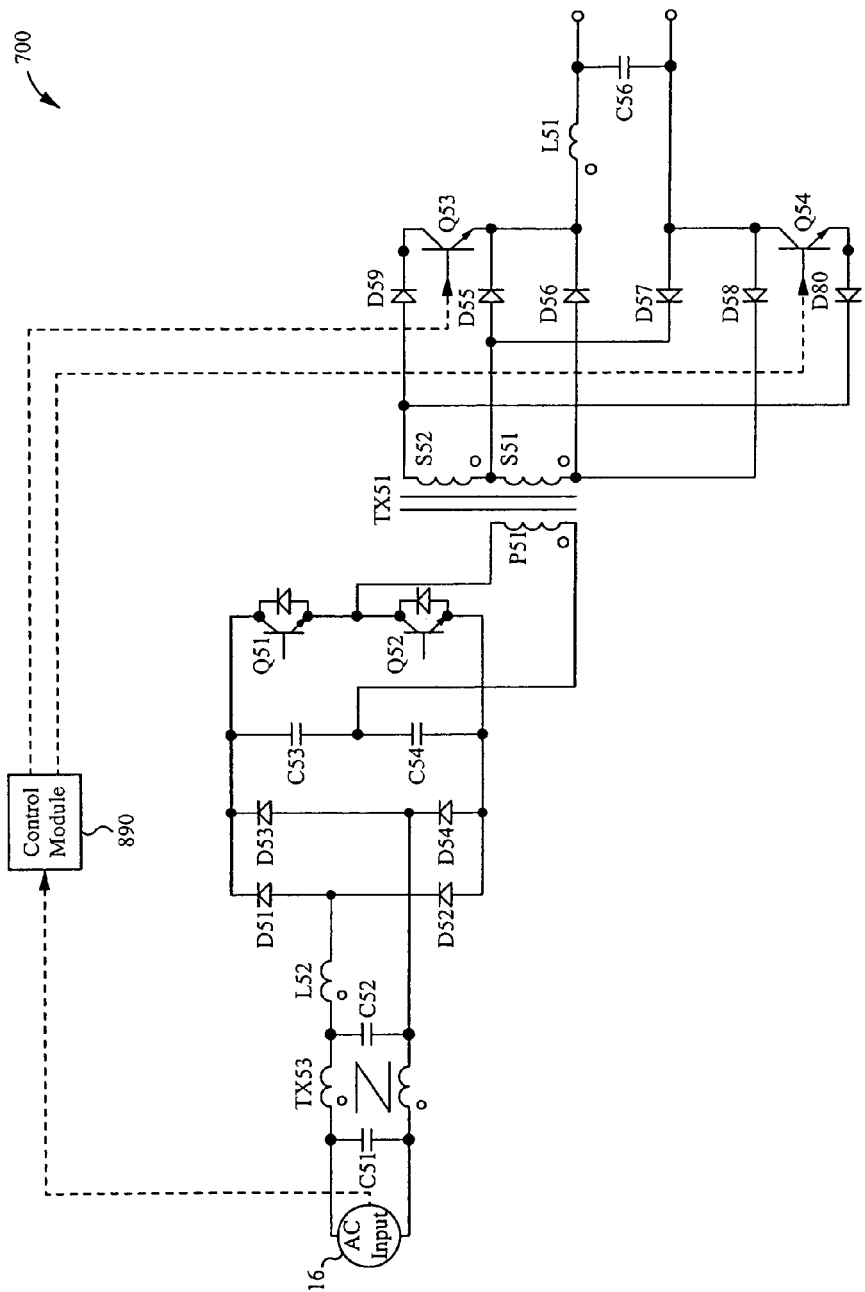
FIG. 8 illustrates a schematic diagram of a sixth exemplary configuration of the power converter of FIG. 2.

FIG. 8 illustrates a schematic diagram of a sixth exemplary configuration of the power converter of FIG. 2. The power converter 700 of FIG. 8 is similar to the power converter 500 of FIG. 6, except that the power converter 700 is configured with a full-wave rectified output. Specifically, the output side of the transformer TX31 of the power converter 500 (FIG. 6) is replaced by two secondary windings S51 and S52, six diodes D55, D56, D57, D58, D59, D80, two transistor tap switches Q53 and Q54, the inductor L51, and an output bulk capacitor C56. The power converter 700 operates in a similar manner as the power converter 500 in FIG. 6, except that the two tap switches Q53 and Q54, and the diodes D55, D56, D57, D58, D59, D80, provide a full-wave rectified output. In an exemplary application, the DC output voltage across capacitor C56 is 12V and the turns ratio for the transformer TX51 is 4:1:1. The configuration of power converter 700 is particularly useful when the isolated converter output voltage is high enough such that the cost and power losses of the extra diodes is less than the cost of the additional transformer windings. The full-wave rectified output configuration can be used with all symmetric isolated buck-type converter topologies such as push-pull, half-bridge, and full-bridge.

Figure 9:
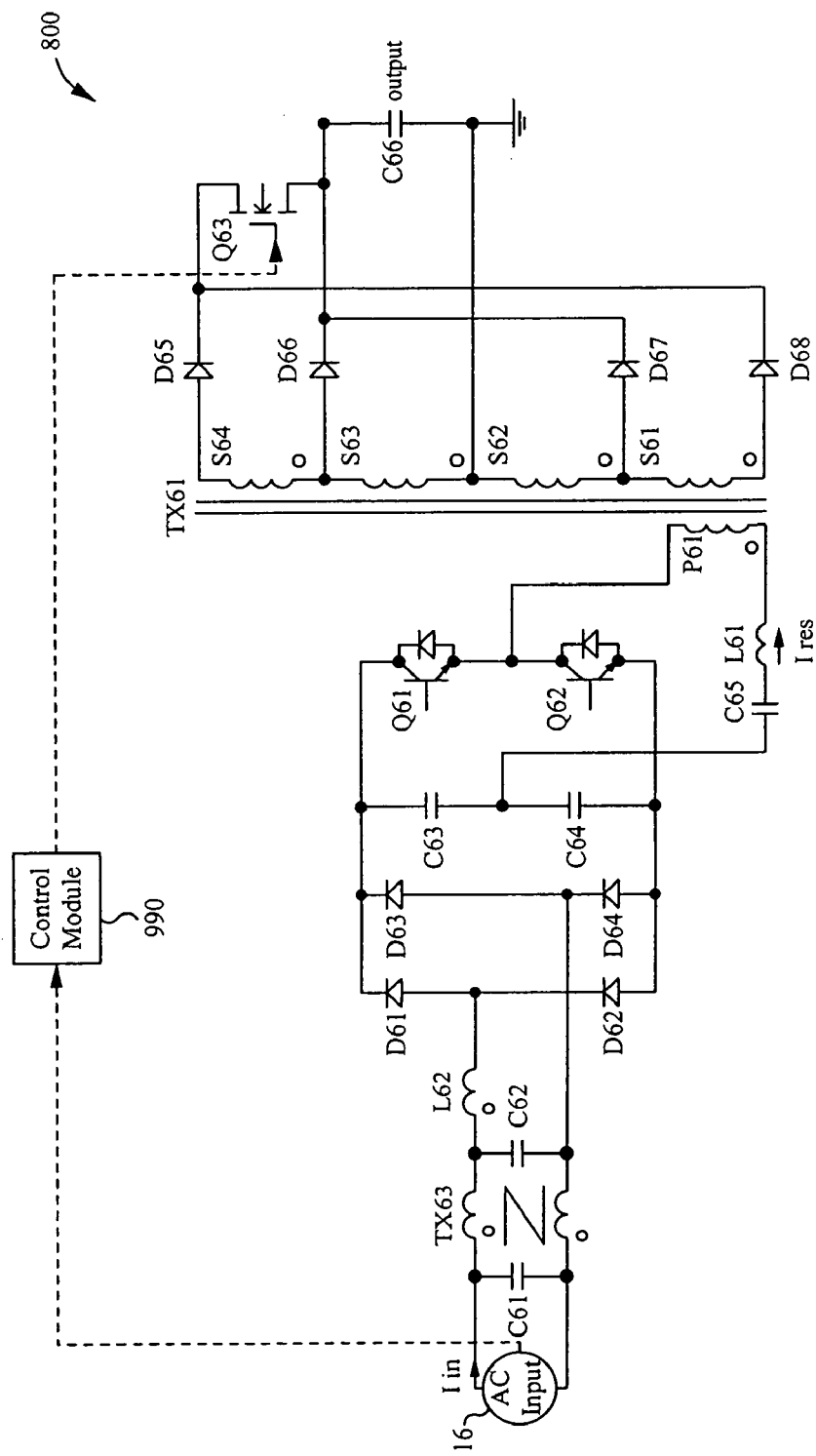
FIG. 9 illustrates a schematic diagram of a seventh exemplary configuration of the power converter of FIG. 2.

FIG. 9 illustrates a schematic diagram of a seventh exemplary configuration of the power converter of FIG. 2. The power converter 800 of FIG. 9 is similar to the power converter 500 of FIG. 6, except that the power converter 800 is configured with a resonant half-bridge converter. Specifically, a resonant tank including a capacitor C65 and an inductor L61 (FIG. 9) are added to the half-bridge converter including the capacitors C63 and C64, the transistors Q61 and Q62, and the isolation transformer TX61, and output filter inductor L31 (FIG. 6) is removed. The resonant half-bridge converter is configured as a series resonant converter. Alternatively, the resonant half-bridge converter can be configured using various resonant schemes including, but not limited to parallel resonant, LLC resonant, or series-parallel resonant. Further, the resonant converter is configured as a half-bridge converter. Alternatively, the resonant converter can be configured in one of many forms of an isolated buck-type converter including, but not limited to, a half-bridge converter, a push-pull converter, a full-bridge converter, and a forward converter. Still alternatively, the resonant converter can be configured according to a quasi-resonant version of any of the isolated buck-type converter configurations described above.

The power converter 800 operates in a similar manner as the power converter 500 in FIG. 6, except that the output power is controlled by changing the switching frequency or resonant frequency (by adjusting a value of a resonant tank component) rather than by adjusting the PWM duty cycle. In an exemplary application, the DC output voltage across capacitor C66 is 12V and the turns ratio for the transformer TX61 is 4:1:1:1:1. The configuration and operation of the power converter 800 including the resonant isolated PFC converter is further described in the co-pending U.S. patent application Ser. No. 12/154,321, filed May 21, 2008, and entitled "Resonant Power Factor Correction Converter", which is hereby incorporated in its entirety by reference.

FIGS. 10A and 10B illustrate exemplary current and voltage waveforms associated with the power converter 800 of FIG. 9. The waveform A corresponds to the AC input voltage to the resonant converter. The waveform B corresponds to the input current Iin to the resonant converter. The exemplary voltage and current levels shown in the waveforms A and B correspond to an AC input of 115 VAC.

The waveform B resembles a sinewave including a few irregularities. Starting from left to right on the waveform B, the input current Iin starts and maintains a zero value. As long as the magnitude of the input line voltage Vin is below 50 VDC, no current Iin flows into the resonant converter. This is due to the maximum output voltage of 12 VDC across the capacitor C66 added to the forward voltage drop of diodes D65 or D68, multiplied by the turns ratio of 4:2 and divided by two since the primary of the half-bridge converter only sees half of the input line voltage. Once the input voltage Vin is greater than 50 VDC, current Iin begins to flow into the resonant converter. At approximately 3 msec, there is an irregularity in the input current Iin, which is due to turning off the transistor Q63, also referred to as the tap switch. The transistor Q63 is turned off when the input line voltage Vin is high enough to halve the turns ratio on the transformer TX61. After turning off the transistor Q63, the input current Iin continues to increase with increasing input line voltage Vin since Vin is greater than 100 VDC. Note that when the transistor Q63 is turned on, Vin is greater than 100V rather than equal to 100V. While it is possible to operate the converter if the turn-on point of the transistor Q63 is set to occur when Vin is exactly 100V, delaying the turn-on point to a value of Vin greater than 100V allows the current stress in the inductor L61 and the primary winding P61 to be equalized during the parts of the cycle when the transistor Q63 is on and when the transistor Q63 is off.

In this example, the resonant current Ires through the resonant inductor L61 rises from 0 amps to approximately 11 amps, as the waveform C shows in FIG. 10C. Upon turning off the transistor Q63, the resonant current Ires drops to between 6 and 7 amps. The resonant current Ires then continues to rise with increasing input voltage Vin, to a peak value of approximately 11 amps. If the transistor Q63 were not turned on, the resonant current Ires would not have temporarily dropped to between 6 and 7 amps, and instead would have continued to increase to a peak value of approximately 16 amps. By reducing the peak resonant current in this manner, the resonant converter can use smaller passive elements, such as capacitor C65, inductor L61 and transformer TX61. Reducing the resonant current also reduces the size of the active switches Q61 and Q62 as well as the power loss through those components. Using the tap switch (transistor Q63) with the additional secondary windings on TX61 reduces the peak resonant current Ires, which substantially reduces the physical size of the path and the components in the resonant converter.

In some embodiments, the transistor Q63 is turned on and off based on the specified values of the input line voltage. These specified trip points are determined such that the peaks of the waveform C (FIG. 10C), the peaks when the transistor Q63 is turned on and off and the peak corresponding to the peak input line voltage Vin, are the same, which in this example is approximately 11 amps. In practice, the transistor Q63 can be turned on and off in response to the magnitude of the input line voltage. The line voltage magnitude at which the transistor Q63 is switched increases for increasing rms values of the line voltage. For example, the transistor Q63 can be configured to switch when the input line transitions past 95 VDC for rms input line voltages of 90 Vrms, and the transistor Q63 can be configured to switch when the input line transitions past 130 VDC for rms input line voltages of 115 VAC, and the switch points can be configured to change linearly with input line rms voltage.

Although the tap switch is described above as turning on and off according to the input line voltage, it is contemplated that each tap switch is configured to be turned on and off according to other parameters. In general, for a buck-type converter to operate, the input voltage must exceed the output voltage. For an isolated buck-type converter, the input voltage must exceed the output voltage reflected through the transformer turns ratio. If for example the output voltage is 24V, the diode drop on the secondary is 1V, and the turns ratio is 2:1, then the input voltage must exceed 50V to draw any current. If the input voltage exceeds, for example, 100V, then the turns ratio can be changed from 2:1 to 4:1 and still draw current. The exact point at which the tap switch is activated can depend on the turns ratio of the transformer windings (both the standard ratio and the ratio with the tap switch activated), the input current waveform that one is trying to achieve, the ratings of the internal components, the rms value of the input voltage, and the ripple on the output bus.

In a second embodiment, the power converter includes two isolated buck-type converters, each with an isolation transformer and a rectifier coupled to an output of the isolation transformer. Each rectifier is coupled to a common output filter that includes a bulk storage capacitor. The voltage across the bulk storage capacitor provides an isolated DC output voltage of the power converter.

The two isolated buck-type converters have inputs tied in series across the full-wave rectified sinewave input. Rectifiers at the output of each isolated converter are connected to a common output capacitor. The series operation of the isolated converters is self-regulating because if the input voltage of one of the series converters drops, the output voltage of that converter drops, causing that converter to draw less power and thereby increase its input voltage. During the high-voltage part of the input AC sinewave, both of the series converters operate. During the low-voltage part of the input AC sinewave, one of the series converters is shorted, thus effectively doubling the voltage conversion ratio from input to output.

Figure 11:
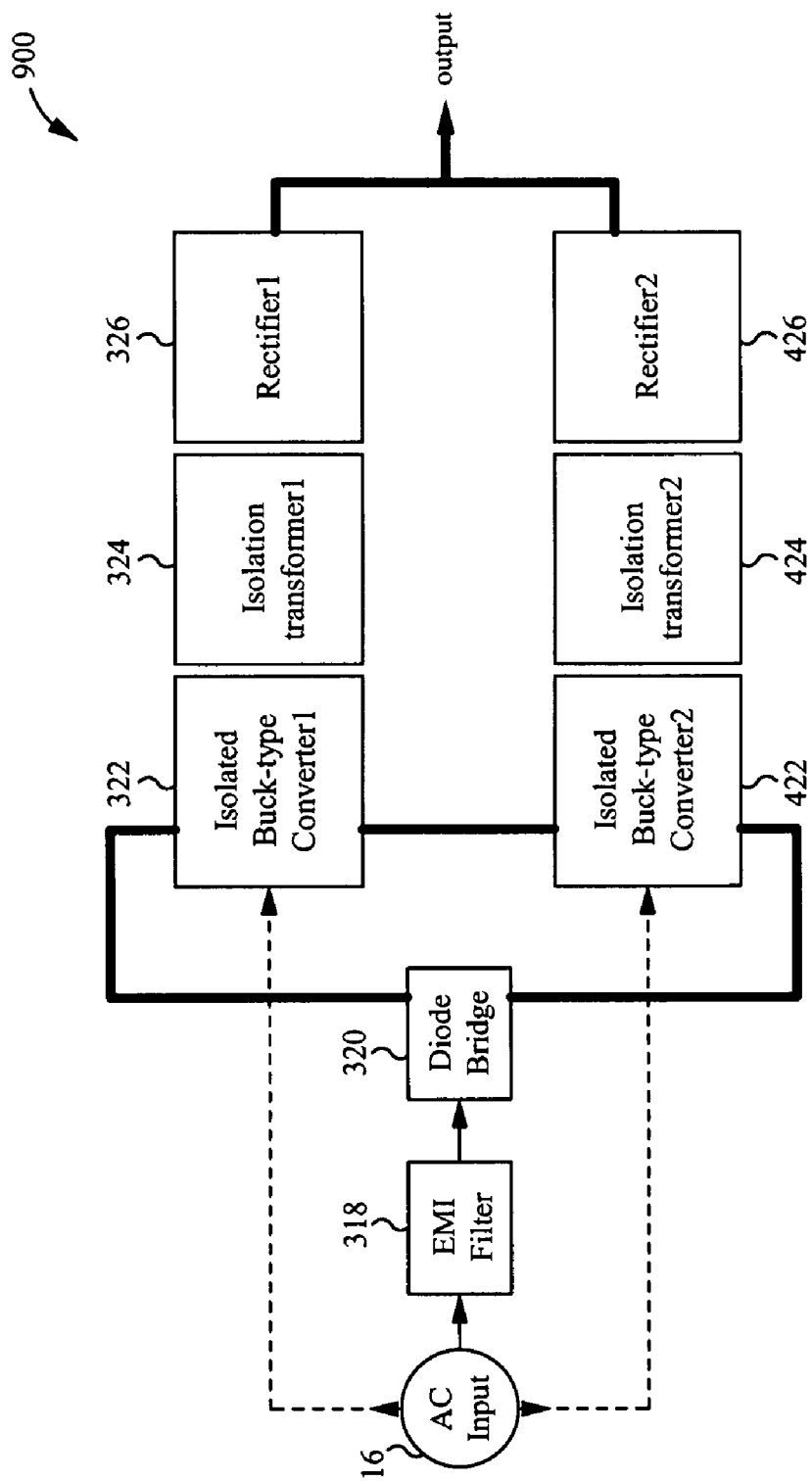
FIG. 11 illustrates a functional block diagram of a power converter in accordance with a second embodiment of the present invention.

FIG. 11 illustrates a functional block diagram of a power converter in accordance with the second embodiment of the present invention. The power converter 900 is configured as a high power factor isolated buck-type power converter. The power converter 900 is coupled to AC input source 16 and includes an EMI filter 318, and a diode bridge 320, which operate in a similar manner as described above.

The power converter 900 also includes two isolated buck-type converter circuits coupled in series across the full-wave rectified sinewave output from the diode bridge 320. The first isolated buck-type converter circuit includes a first isolated buck-type converter 322, a first isolation transformer 342, and first rectifiers 326. The second isolated buck-type converter circuit includes a second isolated buck-type converter 422, a second isolation transformer 424, and second rectifiers 426. The output from the first rectifiers 326 and the output from the second rectifiers 426 are coupled to a common output capacitor. Each of the two isolated buck-type converter circuits is similar to the isolated buck-type converter circuits described above in relation to FIGS. 2-9, except that the isolation transformer does not include a two-tap output and a tap switch is not included. Furthermore, in practice, the power rating of the isolated buck-type converters 322 and 422 is half of the power rating of isolated buck-type converter 222 in FIG. 2 when converters 100 (in FIG. 2) and 900 (in FIG. 11) have the same power rating.

Each of the two isolated buck-type converters 322 and 422 draw current from the AC input 16 when the voltage at the input of the transformers 324 and 424, respectively, scaled by the turns ratio exceeds the voltage at the output. During the high-voltage part of the input AC sinewave provided by the AC input 16, both of the series converters 322 and 422 operate. During the low-voltage part of the input AC sinewave, one of the series converters, for example the converter 322, is shorted, thus effectively doubling the voltage conversion ratio from input to output.

The isolated converters 322, 422 can each be configured in one of many forms of an isolated buck-type converter including, but not limited to, a half-bridge converter, a push-pull converter, a full-bridge converter, and a forward converter. In some embodiments, the isolated converters 322, 422 are configured as a resonant converter according to one of various resonant schemes including, but not limited to series resonant, parallel resonant, series-parallel resonant, and LLC resonant.

Figure 12:
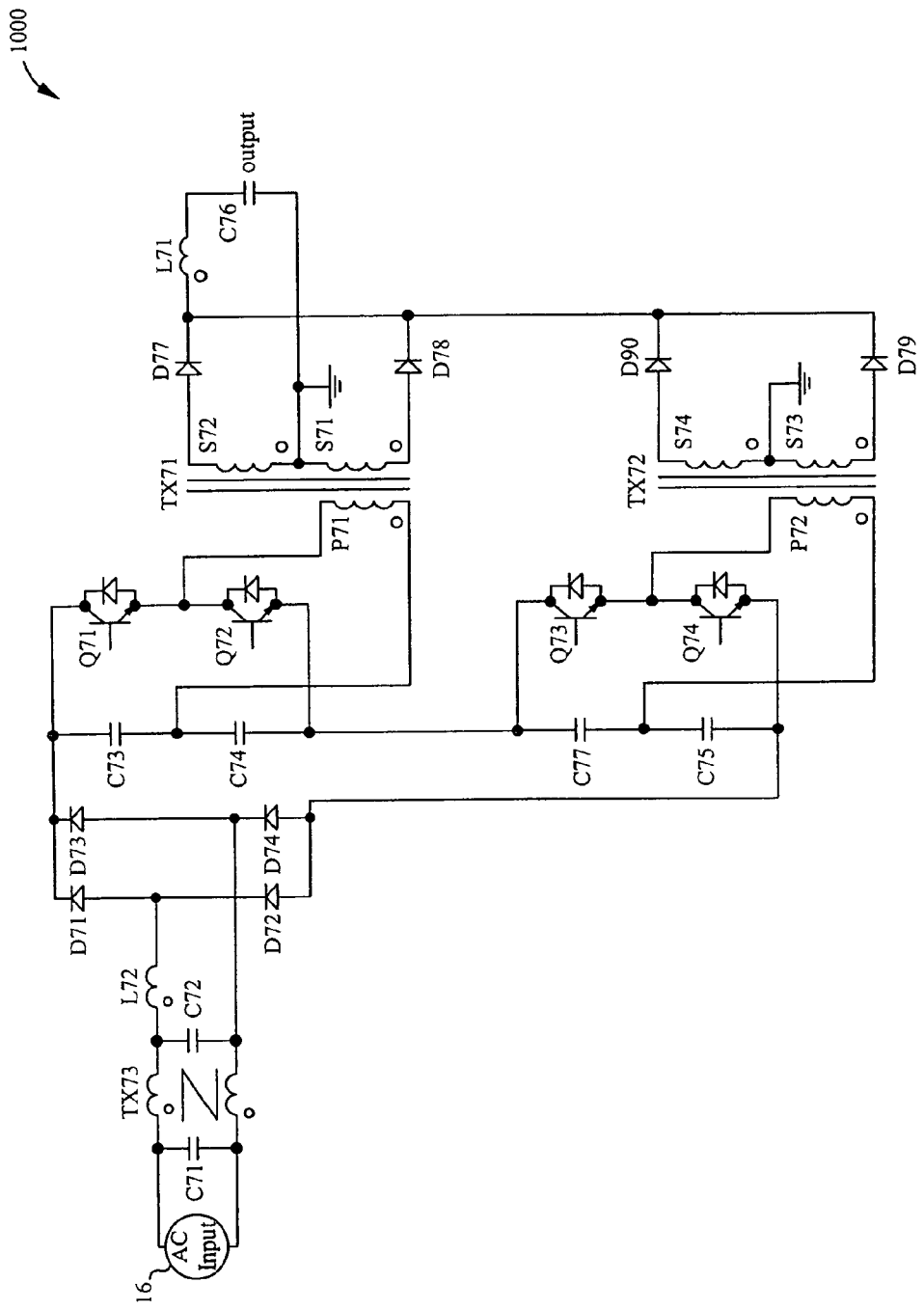
FIG. 12 illustrates a schematic diagram of a first exemplary configuration of the power converter of FIG. 11.

FIG. 12 illustrates a schematic diagram of a first exemplary configuration of the power converter 900 of FIG. 11. The power converter 1000 of FIG. 12 is similar to the power converter 500 of FIG. 6, with the addition of a second isolated half-bridge converter coupled in series with the first isolated half-bridge converter. Another exception is that each half-bridge converter circuit of the power converter 1000 does not include a tap switch, and each isolation transformer of the power converter 1000 includes two secondary windings. During the positive half-cycles of the input AC sinewave, when the corresponding rectified output from the diode bridge 320 (FIG. 11) is below a specific value, for example above about 100 VDC, the transistors Q71 and Q72 are both turned on, essentially shorting the first isolated half-bridge converter, and the second isolated half-bridge converter operates as usual. During the negative half-cycles of the input AC sinewave, when the corresponding rectified voltage is below the specific value, for example below about 100 VDC, the transistors Q73 and Q74 are both turned on, essentially shorting the second isolated half-bridge converter, and the first isolated half-bridge converter operates as usual.

Alternatively, first and second isolated half-bridge converters can be shorted in ways other than using the positive and negative half-cycles. For example, the first isolated half-bridge converter can be shorted when the input line voltage is about 0V to +100 VDC, and the second isolated half-bridge converter can be shorted when the input line voltage is about 0V to −100 VDC.

The series configuration shown in FIG. 12 is applicable to any of the isolated buck-type configurations described above, particularly the half-bridge and full-bridge converter configurations. The series configuration can also be applied to push-pull converters that can easily be shorted by turning on all of the input semiconductors simultaneously. Further, the series configuration can be used for forward converters if an additional transistor switch is placed across the input of at least one of the series converters. In cases where the converter switches are used to short the converter, it is useful to short one of the two series converters only half of the time that shorting is required, for example during the positive portions of the sinewave and when the rectified input voltage is low, and the opposing converter is shorted during the other half of the time, for example during the negative portions of the sinewave and when the rectified input voltage is low, to better share conduction and switching losses across the two series converters.

The series configuration can also be used for resonant, quasi-resonant, and conventionally switched converters. The series configuration can also be used for phase-shifted full-bridge hard-switched or soft-switched converters.

In some embodiments, the rectifiers at the output of an isolated buck-type converter, for example the isolated buck-type converter 222 in FIG. 2 and the isolated buck-type converters 322 and 422 in FIG. 11 are configured as passive rectifiers. In other embodiments, the rectifiers at the output of the isolated buck-type converters can be configured as synchronous MOSFETs.

The present invention has been described in terms of specific embodiments incorporating details to facilitate the understanding of the principles of construction and operation of the invention. The specific configurations shown and the methodologies described in relation to the various modules and the interconnections therebetween are for exemplary purposes only. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A power converter comprising a single-stage isolated buck-type converter including an isolation transformer, the isolation transformer including a first secondary winding coupled in series with a first rectifier circuit, and a second secondary winding coupled in series with a series combination of a second rectifier circuit and a semiconductor switch, wherein the semiconductor switch is configured to turn on and off based on a parameter of an AC voltage input to the power converter, and to adjust a functional turns ratio of the isolation transformer.

2. The power converter of claim 1 wherein the isolation transformer includes a number of discrete windings coupled in series, and the semiconductor switch is configured to adaptively couple a portion of the number of discrete windings to an output bulk capacitor.

3. The power converter of claim 1 further comprising a third rectifier circuit coupled to an input of the single-stage isolated buck-type converter, wherein the third rectifier is configured to output a full-wave rectified DC voltage in response to the AC voltage input.

4. The power converter of claim 1 further comprising an electromagnetic interference filter coupled to an input of the third rectifier circuit.

5. The power converter of claim 1 wherein the AC voltage input includes the range from 90 VAC to 264 VAC.

6. The power converter of claim 1 wherein the single-stage isolated buck-type converter comprises one of the group consisting of a half-bridge converter, a full-bridge converter, a push-pull converter, and a forward converter.

7. The power converter of claim 1 wherein the single-stage isolated buck-type converter further comprises a resonant tank, and the single-stage isolated buck-type converter is configured to operate as a resonant converter.

8. The power converter of claim 7 wherein the resonant converter is configured as one of the group consisting of a series resonant circuit, a parallel resonant circuit, an LLC resonant circuit, and a series-parallel resonant circuit.

9. The power converter of claim 7 wherein the resonant converter comprises one of the group consisting of a half-bridge resonant converter, a full-bridge resonant converter, a push-pull resonant converter, and a forward resonant converter.

10. The power converter of claim 1 further comprising a second semiconductor switch, a third secondary winding, a fourth secondary winding, a third rectifier circuit, and a fourth rectifier circuit, wherein the third secondary winding is coupled in series with the third rectifier circuit, and the fourth secondary winding is coupled in series with a series combination with the second semiconductor switch and the fourth rectifier circuit, wherein the semiconductor switch, the second semiconductor switch, the first rectifier circuit, the second rectifier circuit, the third rectifier circuit, and the fourth rectifier circuit are configured to operate in a push-pull configuration so as to alternately provide a DC voltage to a first and a second output capacitor.

11. The power converter of claim 1 further comprising a second semiconductor switch coupled in series with a third rectifier circuit, wherein the second secondary winding is coupled in series with the series combination of the second semiconductor switch and the third rectifier circuit, wherein the semiconductor switch, the second semiconductor switch, the first rectifier circuit, the second rectifier circuit, and the third rectifier circuit are configured to output a full-wave rectified DC voltage output.

12. The power converter of claim 1 wherein the first secondary winding is center-tapped and coupled to an output bulk capacitor.

13. The power converter of claim 1 wherein the parameter of the AC voltage input is a line voltage input to the single-stage isolated buck-type converter.

14. A power converter comprising:
   a. a first rectifier circuit configured to receive an input AC voltage and to output a full-wave rectified DC voltage;
   b. a single-stage isolated buck-type converter configured to receive the full-wave rectified DC voltage as input, wherein the single-stage isolated buck-type converter includes an isolation transformer comprising a first secondary winding and a second secondary winding;
   c. a second rectifier circuit coupled to the first secondary winding;
   d. a third rectifier circuit coupled to the second secondary winding;
   e. a tap switch coupled to an output of the third rectifier circuit, wherein the tap switch is configured to adjust a functional turns ratio of the isolation transformer; and
   f. a bulk capacitor coupled to an output of the second rectifier circuit and the third rectifier circuit, wherein a voltage across the bulk capacitor is a DC voltage output of the power converter.

15. The power converter of claim 14 wherein the isolation transformer includes a number of discrete windings coupled in series, and the tap switch is configured to adaptively couple a portion of the number of discrete windings to an output bulk capacitor.

16. The power converter of claim 14 further comprising an electromagnetic interference filter coupled to an input of the first rectifier circuit.

17. The power converter of claim 14 wherein the first rectifier circuit outputs a full-wave rectified DC voltage.

18. The power converter of claim 14 wherein the AC voltage input includes the range from 90 VAC to 264 VAC.

19. The power converter of claim 14 wherein the single-stage isolated buck-type converter comprises one of the group consisting of a half-bridge converter, a full-bridge converter, a push-pull converter, and a forward converter.

20. The power converter of claim 14 wherein the single-stage isolated buck-type converter further comprises a resonant tank, and the single-stage isolated buck-type converter is configured to operate as a resonant converter.

21. The power converter of claim 20 wherein the resonant converter is configured as one of the group consisting of a series resonant circuit, a parallel resonant circuit, an LLC resonant circuit, and a series-parallel resonant circuit.

22. The power converter of claim 20 wherein the resonant converter comprises one of the group consisting of a half-bridge resonant converter, a full-bridge resonant converter, a push-pull resonant converter, and a forward resonant converter.

23. The power converter of claim 14 further comprising a second tap switch, a fourth rectifier circuit, a fifth rectifier circuit, and a second bulk capacitor, wherein the first secondary winding is coupled in series with the fourth rectifier circuit, and the second secondary winding is coupled in series with a series combination of the second tap switch and the fifth rectifier circuit, wherein the tap switch, the second tap switch, the second rectifier circuit, the third rectifier circuit, the fourth rectifier circuit, and the fifth rectifier circuit are configured to operate in a push-pull configuration so as to alternately provide a DC voltage to the bulk capacitor and the second bulk capacitor, wherein a voltage across the bulk capacitor and the second bulk capacitor coupled in series is the DC voltage output of the power converter.

24. The power converter of claim 14 further comprising a second tap switch coupled in series with a fourth rectifier circuit, wherein the secondary winding is coupled in series with a series combination of the second tap switch and the fourth rectifier circuit, wherein the tap switch, the second tap switch, the second rectifier circuit, the third rectifier circuit, and the fourth rectifier circuit are configured to output a full-wave rectified DC voltage output across the bulk capacitor.

25. The power converter of claim 14 wherein the first secondary winding is center-tapped and coupled to the bulk capacitor.

26. The power converter of claim 14 wherein the tap switch is configured to adjust the functional turns ratio according to a line voltage input to the single-stage isolated buck-type converter.

27. A power converter comprising:
   a. a first rectifier circuit configured to receive an input AC voltage and to output a full-wave rectified DC voltage;
   b. a first single-stage isolated buck-type converter coupled to the first rectifier including a first isolation transformer having a first primary winding and a first secondary winding, wherein the first primary winding is coupled to the first rectifier circuit and is configured to receive the full-wave rectified DC voltage;
   c. a second single-stage isolated buck-type converter including a second isolation transformer having a second primary winding and a second secondary winding, wherein the second primary winding is coupled to the first rectifier circuit and is configured to receive the full-wave rectified DC voltage, further wherein when the full-wave rectified DC voltage is above a reference level both the first single-stage isolated buck-type converter and the second single-stage isolated buck-type converter are configured to operate, and when the full-wave rectified DC voltage is below the reference level the first single-stage isolated buck-type converter is configured to operate and the second single-stage isolated buck-type converter is shorted to be inoperable;
   d. a second rectifier circuit coupled to the first secondary winding of the first isolation transformer;
   e. a third rectifier circuit coupled to the second secondary winding of the second isolation transformer; and
   f. a bulk capacitor coupled to an output of the second rectifier circuit and an output of the third rectifier circuit, wherein a voltage across the bulk capacitor is a DC voltage output of the power converter.

28. The power converter of claim 27 further comprising an electromagnetic interference filter coupled to an input of the first rectifier circuit.

29. The power converter of claim 27 wherein the AC voltage includes the range from 90 VAC to 264 VAC.

30. The power converter of claim 27 wherein the first single-stage isolated buck-type converter and the second single-stage isolated buck-type converter each comprise one of the group consisting of a half-bridge converter, a full-bridge converter, a push-pull converter, and a forward converter.

31. The power converter of claim 27 wherein the first single-stage isolated buck-type converter and the second single-stage isolated buck-type converter each further comprise a resonant tank, and the first single-stage isolated buck-type converter and the second single-stage isolated buck-type converter are each configured to operate as a resonant converter.

32. The power converter of claim 31 wherein each resonant converter is configured as one of the group consisting of a series resonant circuit, a parallel resonant circuit, an LLC resonant circuit, and a series-parallel resonant circuit.

33. The power converter of claim 31 wherein each resonant converter comprises one of the group consisting of a half-bridge resonant converter, a full-bridge resonant converter, a push-pull resonant converter, and a forward resonant converter.

34. A method of operating a power converter comprising changing a functional turns ratio of a single-stage isolated buck-type converter isolation transformer in response to a magnitude of an AC input voltage such that when the magnitude of the AC input voltage is less than a reference level, the functional turns ratio is a first ratio, and when the magnitude of the AC input voltage is equal to or greater than the reference level, the functional turns ratio is a second ratio less than the first ratio, and a DC output voltage from the single-stage isolated buck-type converter divided by the functional turns ratio is greater in magnitude than the magnitude of the AC input voltage.

35. The method of claim 34 wherein changing the functional turns ratio comprises opening or closing a tap switch coupled in series with a secondary winding on the isolation transformer.

36. The method of claim 34 wherein changing the functional turns ratio comprises shorting one of two single-stage isolated buck-type converters, wherein the two single-stage isolated buck-type converters are coupled in series and a common bulk capacitor is coupled to an output of each of the two single-stage isolated buck-type converters.

37. The method of claim 34 wherein the magnitude of the AC input voltage at which the functional turns ratio is changed is a function of an RMS value of the AC input voltage.

38. The method of claim 34 wherein the single-stage isolated buck-type converter is a resonant converter and a switching frequency is varied in response to a converter load and to an RMS value of the AC input voltage, and the switching frequency is not varied in response to an instantaneous magnitude of the AC input voltage.

39. The power converter of claim 1 further comprising a second semiconductor switch, a third secondary winding, a third rectifier circuit, wherein the third secondary winding is coupled in series with the third rectifier circuit.

40. The power converter of claim 14 further comprising a second semiconductor switch, a third secondary winding, a fourth secondary winding, and a fourth rectifier circuit, wherein the third secondary winding is coupled in series with the third rectifier circuit, and the fourth secondary winding is coupled in series with a series combination with the second semiconductor switch and the fourth rectifier circuit, wherein the semiconductor switch, the second semiconductor switch, the first rectifier circuit, the second rectifier circuit, the third rectifier circuit, and the fourth rectifier circuit are configured to operate in a push-pull configuration so as to alternately provide a DC voltage to a first and a second output capacitor.

41. The power converter of claim 27 further comprising a second tap switch coupled in series with a fourth rectifier circuit, wherein the secondary winding is coupled in series with a series combination of the second tap switch and the fourth rectifier circuit, wherein the tap switch, the second tap switch, the second rectifier circuit, the third rectifier circuit, and the fourth rectifier circuit are configured to output a full-wave rectified DC voltage output across the bulk capacitor.

* * * * *